US006847390B2

(12) United States Patent
Maeda

(10) Patent No.: US 6,847,390 B2
(45) Date of Patent: Jan. 25, 2005

(54) METHOD AND APPARATUS FOR IMAGE FORMING CAPABLE OF EFFECTIVELY ADJUSTING AN IMAGE RECORDING START POSITION

(75) Inventor: Katsuhiko Maeda, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 150 days.

(21) Appl. No.: 10/197,892

(22) Filed: Jul. 19, 2002

(65) Prior Publication Data

US 2003/0030718 A1 Feb. 13, 2003

(30) Foreign Application Priority Data

Jul. 19, 2001 (JP) ........................................ 2001-218993

(51) Int. Cl.[7] .............................................. B41J 2/435
(52) U.S. Cl. ...................................... 347/250; 347/235
(58) Field of Search ................................ 347/234, 235, 347/236, 237, 246, 247, 248, 249, 250; 250/205

(56) References Cited

U.S. PATENT DOCUMENTS 4,386,272 A    5/1983  Check, Jr. et al. .......... 250/236
5,105,077 A *  4/1992  Asada ......................... 250/205
6,178,031 B1   1/2001  Rauch et al. ................. 359/216
6,469,730 B2 * 10/2002  Tanimoto et al. ........... 347/249

FOREIGN PATENT DOCUMENTS

| EP | 1 014 145   | 6/2000 |
| JP |   2642351   | 8/1997 |
| JP | 2001-18444  | 1/2001 |

* cited by examiner

Primary Examiner—Hai Pham
(74) Attorney, Agent, or Firm—Oblon, Spivak, McClelland, Maier & Neustadt, P.C.

(57) ABSTRACT

An image forming apparatus includes at least one image forming mechanism configured to form an image based on image data. Each image forming mechanism includes an optical system, a sensor, an electronic circuit, and a controller. The optical system scans a photosensitive member with a light beam based on image data. The sensor detects the light beam and the electronic circuit stores a correction data table containing light amount data of the light source and corresponding start position shift amount data. The controller controls a light amount of the light source and adjusts a start position of image recording on the photosensitive member in accordance with a sync detect signal. The controller includes a write start position correction unit that adjust the start position of the image recording based on a start position shift amount data when the light amount varies.

65 Claims, 13 Drawing Sheets

METHOD AND APPARATUS FOR IMAGE FORMING CAPABLE OF EFFECTIVELY ADJUSTING AN IMAGE RECORDING START POSITION

BACKGROUND OF THE INVENTION

Field of the Invention

The present invention relates to a method and apparatus for image forming, and more particularly to a method and apparatus for image forming that is capable of effectively adjusting an image recording start position using a relationship between a light amount and a scanning time shift.

DISCUSSION OF THE BACKGROUND

In an electrophotographic image forming apparatus such as a laser printer, a digital copying machine, or the like, a start position for recording an image on a photosensitive member is determined through sequential processes including an activation of a semiconductor laser (hereinafter referred to as a laser diode) to emit a light beam based on image data and a control of a raster scanning operation (i.e., a main scanning and a sub-scanning) with the light beam relative to a photosensitive image recording surface. The control of the raster scanning operation is required to have the same start position to record an image each time the main scanning is performed to reproduce an image without a distortion. For this reason, an optical system is usually provided with a sensor (hereinafter referred to as a sync detect sensor) for detecting the scanning light beam. The sync detect sensor is normally arranged at a position at a side of the photosensitive member where the scanning is initiated and outside of an image region. The sync detect sensor detects the scanning light beam that is diverged from the light beam by a polygon mirror and, based on a detected signal (hereinafter referred to as a sync detect signal /DETP) from the sync detect sensor, the control of the raster scanning operation adjusts the start position of the image recording member each time the main scanning is performed.

Accordingly, if an effective edge of the sync detect signal /DETP is delayed or advanced, an amount of such variation causes a distortion of an image recorded in the main scanning direction. For example, in a full color image forming apparatus that forms a full color by overlaying yellow, magenta, cyan, and black color images, a serious color distortion is caused by the variations in the effective edges of the sync detect signals /DETP_Y, /DETP_M, /DETP_C, and /DETP_BK. In other words, a misalignment of the starting position for one color compared to the other colors prevents the formation of the full color image from multiple colors. The faster the write clock signal, the larger the image distortion relative to the time variations. Therefore, it becomes a greater problem for a faster print speed apparatus.

In an image forming apparatus, conditions of image forming are generally optimized for accounting for environmental changes, a change of a machine condition over time, a change of a linear speed process, a change of resolution, a print mode change, and so forth. This optimization includes a control of a light amount from the light source (i.e., the laser diode).

A change of an LD (laser diode) light amount is sensed and output by the sync detect sensor. The light beam from a general sync detect sensor is typically received by a photodiode (PD). A detection operation by the sync detect sensor is explained with reference to FIG. 1. FIG. 1 shows the formation of variable-length sync detect signals by the sensor when the light amount produced by the LD changes. The output of the photodiode, the sync detect signal /DETP, is usually segmented into two levels with a predetermined threshold level. Therefore, variations in the voltage level of outputs from the photodiode produce different light amounts A, B, and C, as shown in FIG. 1. Such differences in the light amount cause variations in timing of the signal. For example, the light amount B, which is smaller than the light amount A, causes a delay Tb relative to a falling edge of the sync detect signal /DETP with the light amount A. The light amount C, which is greater than the light amount A, causes an advance Tc relative to a falling edge of the sync detect signal /DETP with the light amount A.

In a color image forming apparatus, the light amount for each color may be changed due to an adjustment of color balance or the like. In such a case, however, the timing of the sync detect signal /DETP of each color may be changed and accordingly an image distortion (i.e., a color distortion) may be caused. In this process, if the same light amount is changed for each color, an absolute start position of image recording may be shifted but an image distortion (i.e., a color distortion) may not be caused.

However, some image forming apparatuses use a plurality of scanning light beams converted from a plurality of straight light beams by a polygon mirror and cause at least one scanning light beam to run in a reverse direction compared the other light beams. In this case, if the same light amount is changed for each color, the light beam running in the reverse direction will cause an image distortion (i.e., a color distortion).

Further, the above-mentioned problem may also occur in an image forming apparatus that is not a color machine but uses a plurality of light beams to simultaneously write an image on the surface of the photosensitive member.

SUMMARY OF THE INVENTION

A novel image forming apparatus capable of adjusting an image recording start position on the photosensitive member is presented. In one example, an image forming apparatus includes a photosensitive member, a light source, an optical unit configured to scan a surface of the photosensitive member with a light beam produced by the light source, a sensor disposed at a side of the photosensitive member and configured to detect the light beam from the light source at the side of the photosensitive member before the light beam scans an image region in a main scanning direction on the photosensitive member, and the sensor outputs a detected signal, an electronic circuit configured to store data information and to produce a corrected signal based on a correction data table containing light amount data of the light source corresponding to various image forming conditions and a start position shift amount data, and a controller unit configured to control a light amount of the light source based on the correction data table, so that a start position on the photosensitive member of the light beam produced by the light source is adjusted based on the detected signal and the corrected signal, and the controller unit shifts the start position of the light beam on the photosensitive member for image recording when the light amount of the light source detected by the sensor changes from a reference value.

In another example, a novel image forming apparatus includes at least one image forming mechanism configured to form an image based on image data. Each of the above-mentioned at least one image forming mechanisms includes an optical system, a sensor, a memory, and a controller. The optical system is configured to scan a surface of a photosensitive member with a light beam emitted from a light source in accordance with image data. The sensor is arranged at a predetermined position relative to the photosensitive member and is configured to detect the light beam at an initial side before an image region on a scanning line in a main scanning direction is performed and to output a sync detect signal. The memory stores a correction data table containing light amount data of the light source according to image forming conditions and corresponding start position shift amount data. The controller is configured to control a light amount of the light source according to the image forming conditions and to determine a start position of image recording in accordance with the sync detect signal detected by the sensor. This controller includes a write start position correction unit configured to shift the start position of image recording in accordance with the start position shift amount data from the correction data table when the light amount of the light source is changed according to the image forming conditions.

The write start position correction unit may shift the start position of image recording in two separate stages in units of a pixel dot and in units of a shift amount smaller than a pixel dot.

The write start position correction unit may generate a signal for determining a timing to load the image data.

The write start position correction unit may shift the start position of image recording in accordance with a difference of the light amount between an actual light and a predetermined reference light.

The write start position correction unit may shift the start position of image recording in accordance with a difference of the light amount between corresponding light and reference light that is designated when a write start position in the main scanning direction is adjusted through a performance of image forming onto the photosensitive member.

The corresponding start position shift amount data stored in the memory may be changed.

The memory may prestore a plurality of different correction data tables each containing light amount data of the light source designated according to image forming conditions and corresponding start position shift amount data.

The above-mentioned image forming apparatus may further include an operator input mechanism configured to allow an operator to input an instruction for selecting one of the plurality of different correction data tables.

The above-mentioned at least one image forming mechanisms may include image forming mechanisms for handling yellow, magenta, cyan, and black color images.

The optical systems of the above-mentioned at least one image forming mechanisms including the image forming mechanisms for yellow, magenta, cyan, and black colors may share a common polygon mirror.

In another example, a novel method of image forming capable of adjusting an image recording start position on the photosensitive member is presented. In one example, this novel method includes the steps of separating, providing, handling, scanning, detecting, storing, controlling, determining, and shifting. The separating step separates image data into a plurality of image data streams. The providing step provides a same plurality of image forming mechanisms as the plurality of image data streams. The handling step handles in parallel the plurality of image data streams with respective of the plurality of image forming mechanisms. The scanning step scans in each of the plurality of image forming mechanisms a surface of a photosensitive member with a light beam emitted from a light source in accordance with each of the plurality of image data streams. The detecting step detects in each of the plurality of image forming mechanisms the light beam at an initial side before an image region on a scanning line in a main scanning direction to output a sync detect signal. The storing step previously stores in each of the plurality of image forming mechanisms a correction data table containing light amount data of the light source designated according to image forming conditions and corresponding start position shift amount data. The controlling step controls in each of the plurality of image forming mechanisms a light amount of the light source according to the image forming conditions. The determining step determines in each of the plurality of image forming mechanisms a start position of image recording in accordance with the sync detect signal detected by the detecting step. The shifting step shifts in each of the plurality of image forming mechanisms the start position of image recording in accordance with the start position shift amount data from the correction data table when the light amount of the light source is changed according to the image forming conditions.

The shifting step may shift the start position of image recording in two separate stages in units of a pixel dot and in units of a shift amount smaller than a pixel dot.

The shifting step may generate a signal for determining a timing to load the image data.

The shifting step may shift the start position of image recording in accordance with a difference of the light amount between corresponding light and predetermined reference light.

The shifting step may shift the start position of image recording in accordance with a difference of the light amount between corresponding light and reference light that is designated when a write start position in the main scanning direction is adjusted through a performance of image forming onto the photosensitive member.

The corresponding start position shift amount data stored in the storing step may be changed.

The storing step may prestore a plurality of different correction data tables each containing light amount data of the light source designated according to image forming conditions and corresponding start position shift amount data.

The above-mentioned method may further include a step of allowing an operator to input an instruction for selecting one of the plurality of different correction data tables.

The same plurality of image forming mechanisms may include image forming mechanisms for handling yellow, magenta, cyan, and black color images.

The same plurality of image forming mechanisms including the image forming mechanisms for handling yellow, magenta, cyan, and black color images may share a common polygon mirror.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
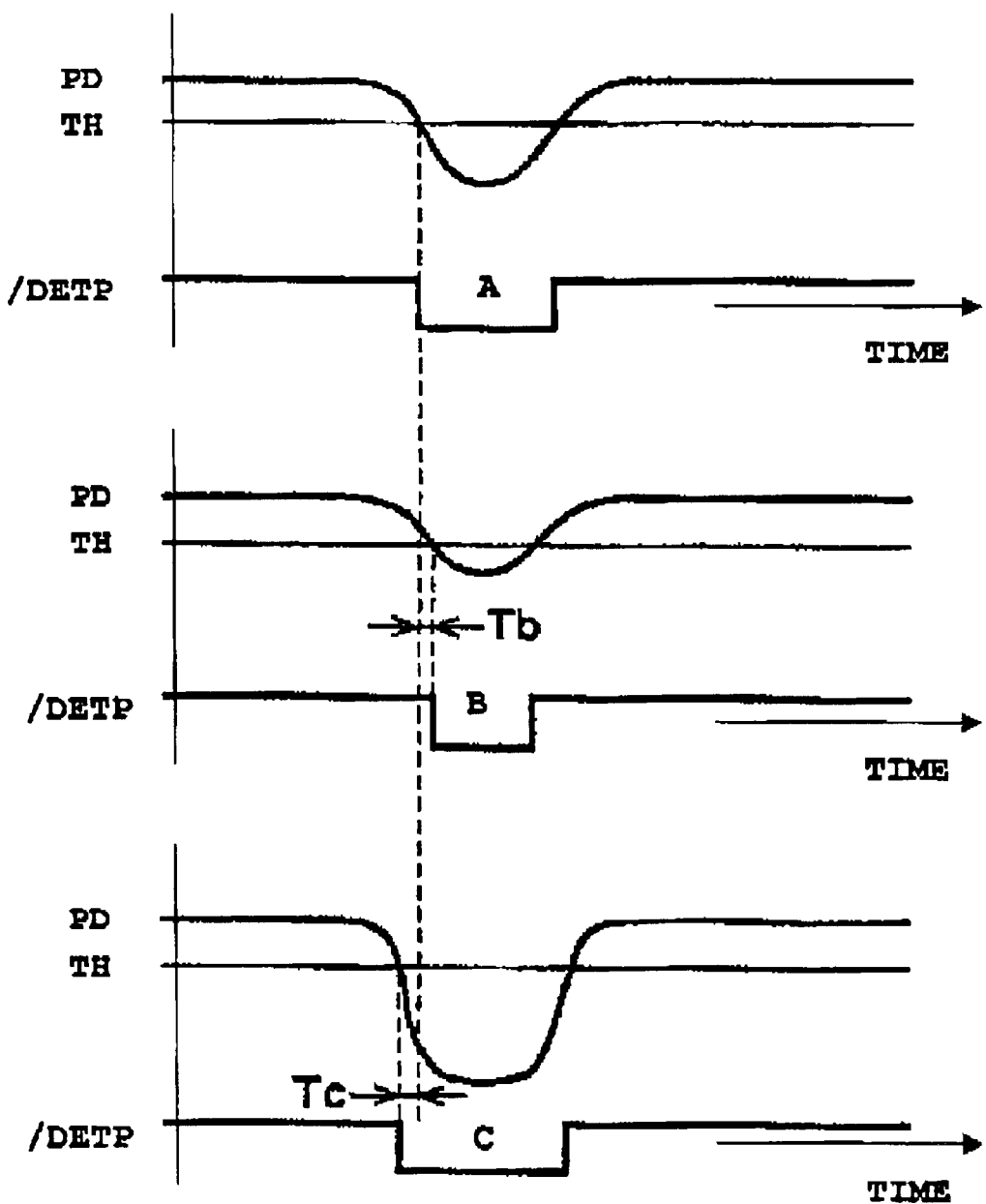
FIG. 1 shows time charts for explaining delays of a sync detect signal in an optical scanning system as a function of a light amount received by a photoreceptor used therein.

In describing the preferred embodiments illustrated in the drawings, specific terminology is employed for the sake of clarity. However, the disclosure is not intended to be limited to the specific terminology so selected and it is to be understood that each specific element includes all technical equivalents that operate in a similar manner.

Figure 2:
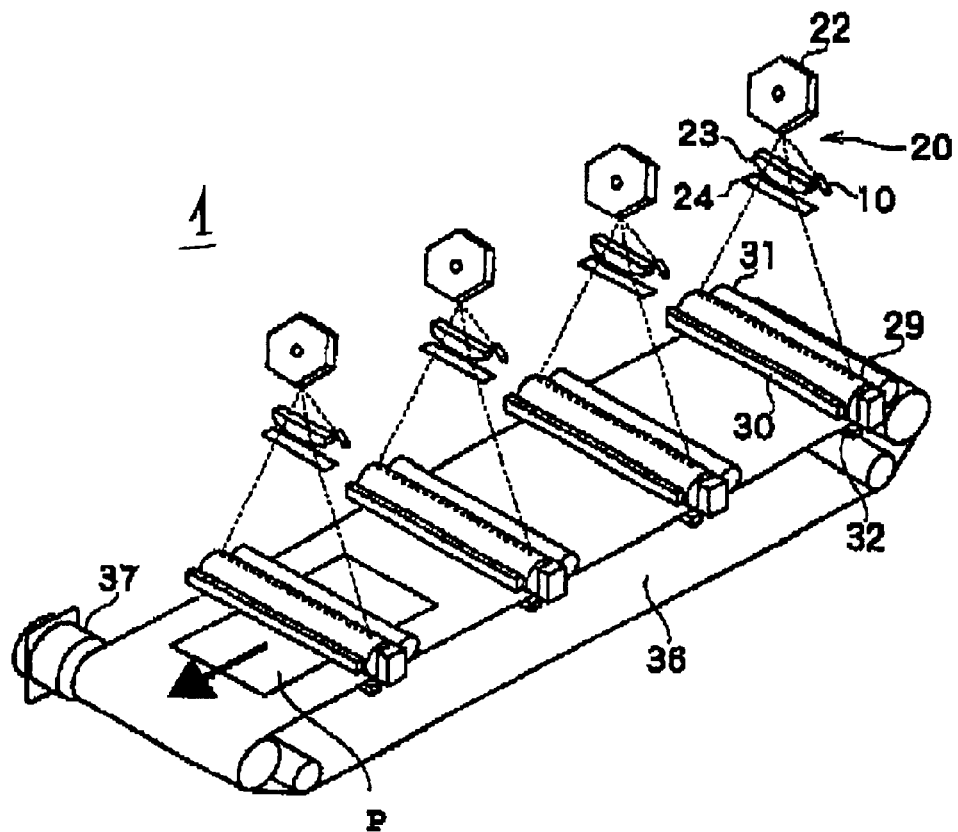
FIG. 2 is a schematic illustration for explaining an exemplary structure of a main part of an image fixing apparatus according to a preferred embodiment of the present invention.

Referring now to the drawings, wherein like reference numerals designate identical or corresponding parts throughout the several views, and particularly to FIG. 2, a description is made for a four-drum type color image forming apparatus 1 as one example of an electrophotographic image forming apparatus according to a preferred embodiment of the present invention. FIG. 2 shows the color image forming apparatus 1 provided with four image forming units and four optical units 20 to form and overlay yellow (Y), magenta (M), cyan (C), and black (BK) color images one over another to form a color image. As shown in FIG. 2, each of the image forming units includes a photosensitive member 29, a charging unit 30, a development unit 31, and a transfer unit 32. Each of the optical units 20 includes an LD (laser diode) unit 10, a polygon mirror 22, an fθ (ef-theta) lens 23, and a BTL (barrel toroidal lens) 24.

A light beam emitted from the LD unit 10 is converted into a light beam having an on and off signal thereon by an LD driving unit (not shown) that is activated in response to image information data after a color separation is performed on image data. Each light beam travels ahead with turning on and off signals according to the color separated image information data and is deflected by the rotating polygon mirror 22. Then, the deflected light beam becomes a sweeping light beam and is brought to pass through the fθ lens 23. Subsequently, the sweeping light beam impinges on the photosensitive member 29 and sweeps the photosensitive member 29 along a main scanning direction, and the photosensitive member 29 is entirely and evenly charged by the charging unit 30. When the sweeping light beam having the on and off signal thereon impinges on the photosensitive member 29, the sweeping light beam scans the charged surface of the photosensitive member 29, thereby forming an electrostatic latent image thereon. The electrostatic latent image formed on the photosensitive member 29 is then subjected to the sequential electrophotographic processes performed by the above-mentioned charging unit 30, the development unit 31, and the transfer unit 32 so that a color image made of four individual color images according to the color separated image information data is formed on a recording sheet P.

In FIG. 2, reference numeral 36 denotes a transfer belt for transferring the recording sheet P and reference numeral 37 denotes a transfer belt drive motor for driving the transfer belt 36 in a direction indicated by an arrow. As the recording sheet P carried by the moving transfer belt 36 is brought to pass sequentially by the four image forming units for receiving the respective four individual colors, the four images of the four individual colors are in turn transferred into a color image on the recording sheet P.

Figure 3:
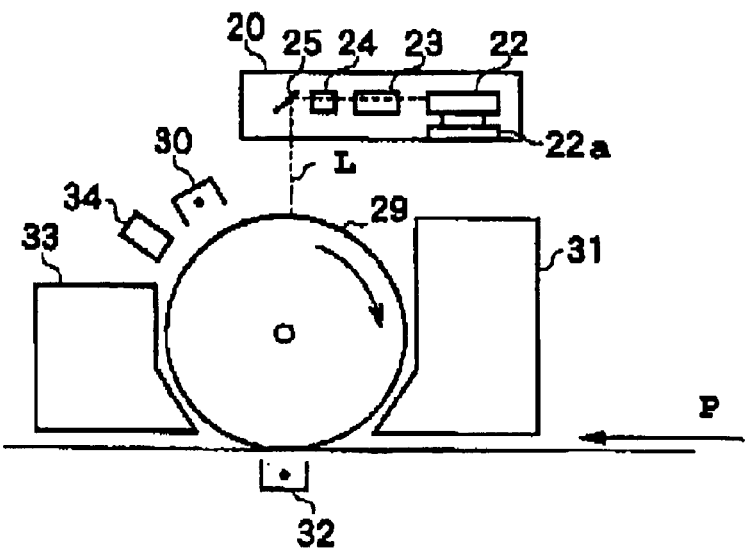
FIG. 3 is an enlarged view of an image forming mechanism with an optical unit for handling one color images, the image forming mechanism being part of the image forming apparatus shown in FIG. 2.

FIG. 3 shows one of the four optical units 20 and one of the four image forming units for manipulating the color in the color image forming apparatus shown in FIG. 2. In FIG. 3, a light beam L emitted from the LD (laser diode, not shown) is turned on and off in accordance with image data and is collimated with a collimate lens (not shown). Then, the light beam passes through a cylinder lens (not shown) and is deflected by the polygon mirror 22, which is rotated by a polygon motor 22a, thereby becoming the sweeping light beam. After that, the sweeping light beam passes through the fθ lens 23 and BTL 24 and is deflected by a mirror 25 to the photosensitive member 29. Subsequently, the sweeping light beam scans the surface of the photosensitive member 29. The above-mentioned BTL 24 performs a focusing in a sub-scanning direction, that is, both a light-gathering function and a position correction including a surface falling correction in the sub-scanning direction.

In the image forming unit, the charging unit 30, the development unit 31, the transfer unit 32, a cleaning unit 33, and a discharging unit 34 are arranged around the photosensitive member 29 and respectively perform charging, exposure, development, and transfer processes to form an image on a recording sheet.

Figure 4:
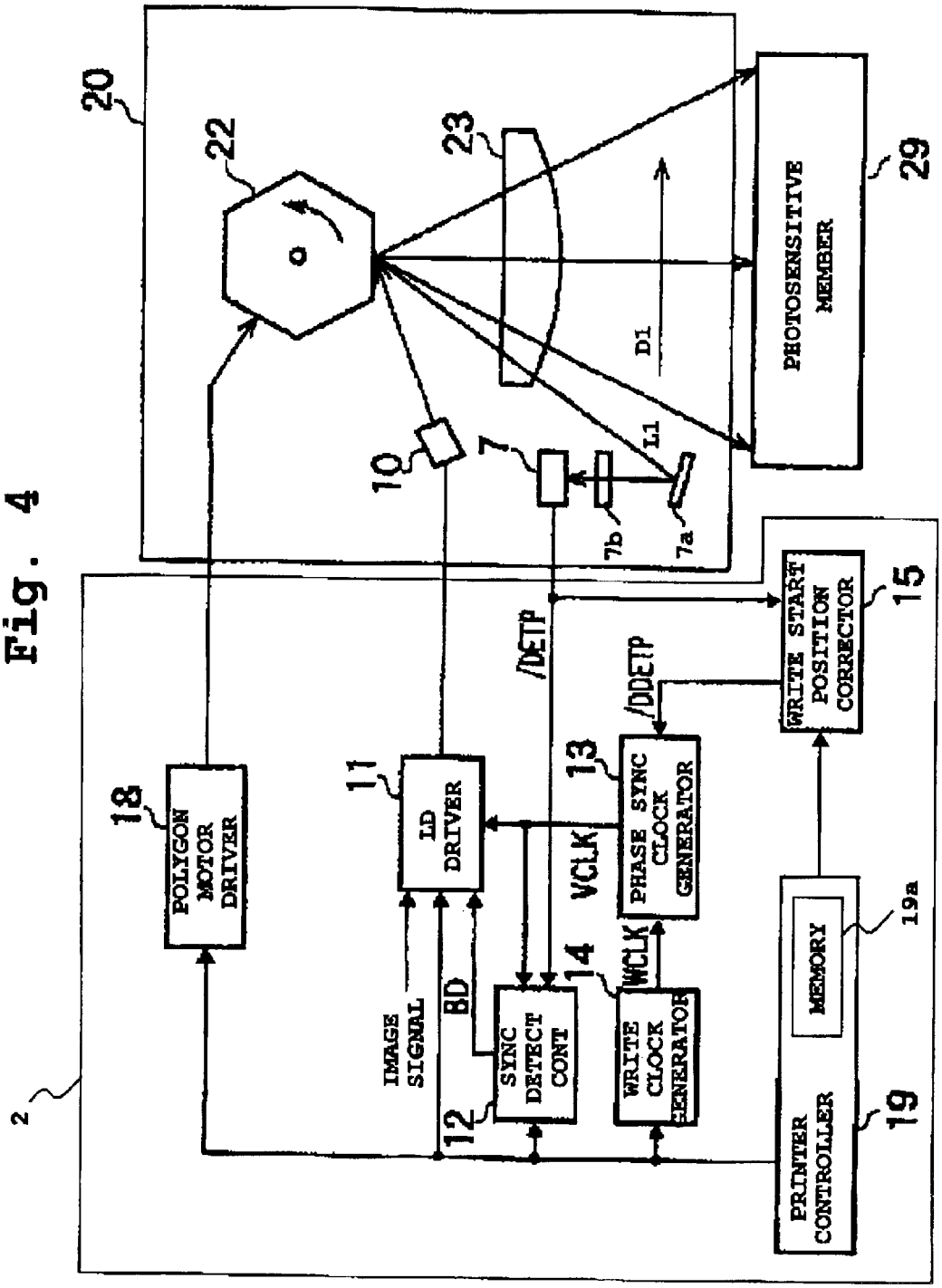
FIG. 4 is a block diagram of an image recording controlling circuit connected to the optical unit.

FIG. 4 shows an image recording controlling circuit 2 connected to an optical unit 20 for handling information data corresponding to one color. A similar configuration is provided to handle each of the remaining colors. The image recording controlling circuit 2 shown in FIG. 4 is provided with a data table that stores a plurality of predetermined light amount values of the light source, determined in response to various conditions for the image forming, and a plurality of time shift amounts for an image recording position in response to the predetermined light amount values. With this data table, the image recording controlling circuit adjusts the start image recording position on the photosensitive member by adjusting the start position with a predetermined amount in a simple and stable manner without using an optical sensor.

In more detail, the light beam coming from the polygon mirror 22 and producing an image on the photosensitive member 29 must start for any color at the same starting position to produce a final image where all the colors are superposed one on top of the other. As shown in FIG. 1, in a background image producing apparatus, the amount of light coming from the laser device changes according to environmental changes, a machine condition over time, a linear speed of a process, resolution changes, print mode changes, etc. Therefore, any change in the amount of light produced by the light source will determine in a background image-forming apparatus a change in the amount of light detected by the optical sensor, and consequently a signal produced by the optical sensor would have various time durations, as shown in FIG. 1, symbols A, B and C. However, because the threshold TH is constant, a change in the amount of light produced by the PD determines a shift in time of the signal detected by the optical sensor, either advancing in time Tb or being delayed in time Tc, see FIG. 1.

The present inventor has recognized that the delay in time of the signal produced by the optical sensor can be adjusted if the image recording controlling circuit 2, as shown in FIG. 4, adjusts the signal /DETP produced by the optical sensor in a write start position correction unit 15 to produce a corrected signal /DDETP, so that the start position of the recording image on the photosensitive member is the same under various image forming conditions.

In FIG. 4, the optical unit 20 and the photosensitive member 29 are configured as described above with reference to FIGS. 2 and 3. However, the optical unit 20 further includes a sensor 7 for detecting a light beam L1 at a position next to a start position of the image recording area in the main scanning direction D1 on the photosensitive member 29. The light beam L1 passing through the fθ lens 23 is deflected by a mirror 7a, passes through a lens 7b, and falls on the sensor 7. The sensor 7 detects the light beam L1 each time scanning is performed and generates the scan sync signal /DETP that is sent to the image recording controlling circuit.

The image recording controlling circuit 2 of FIG. 4 includes the LD (laser diode) driver 11, a sync detect controller 12, a phase sync clock generator 13, a write clock generator 14, a write start position correction 15, a polygon motor driver 18, and a printer controller 19. As shown in FIG. 4, the controller 19 sends a signal to other components to govern the operations of the other components of the image recording controlling circuit 2 and includes an electronic circuit, which can be for example a memory 19a, for storing the predetermined correction data table, explained later. Each of the sync detect controller 12 and the write start position correction unit 15 receives a sync detect signal /DETP produced by the sensor 7. In this example, a position of starting an image writing in the main scanning direction is basically determined based on the sync detect signal /DETP. The write start position correction unit 15 adjusts the timing of the sync detect signal /DETP and sends such a time-adjusted sync detect signal, which is referred to as a main scanning sync signal /DDETP in FIG. 4, to the phase sync clock generator 13.

The phase sync clock generator 13 receives the main scanning sync signal /DDETP and a clock signal WCLK sent from the write clock generator 14 to generate a clock signal VCLK in synchronism with the main scanning sync signal /DDETP and sends /DDETP to the LD driver 11 and the sync detect controller 12.

The sync detect controller 12 detects the sync detect signal /DETP under an initial asynchronous condition and activates a beam drive signal BD to forcibly drive the LD 10 via the LD driver 11. After a detection of the sync detect signal /DETP, the sync detect controller 12 generates the beam drive signal BD, based on the sync detect signal /DETP and the clock signal VCLK, which includes the time-adjusted sync detect signal /DDETP, at such a timing to detect the sync detect signal /DETP and not to cause a light flare. The generated beam drive signal BD is sent to the LD driver 11 so that the LD unit 10 is driven in a preferable manner.

The LD driver 11 drives the LD unit 10 with the beam drive signal BD, as described above, to generate the sync detect signal /DETP. Also, for the image recording, the LD driver 11 drives the LD unit 10 to light on in accordance with input image data therein in synchronism with the clock signal VCLK that is generated by the phase sync clock generator 13 based on the time-adjusted sync detect signal /DDETP and the clock signal WCLK from the write clock generator 14. The light beam emitted by the LD unit 10 in synchronism with the clock signal VCLK is deflected by the polygon mirror 22, passes through the fθ lens 23, and scans the surface of the photosensitive member 29 from the position-adjusted write start point instead of from the position write start point that may be different for each color depending on the environmental changes of the image producing device. The polygon motor driver 18 controls the polygon motor 22a to rotate at a predetermined number of revolutions.

Figure 5:
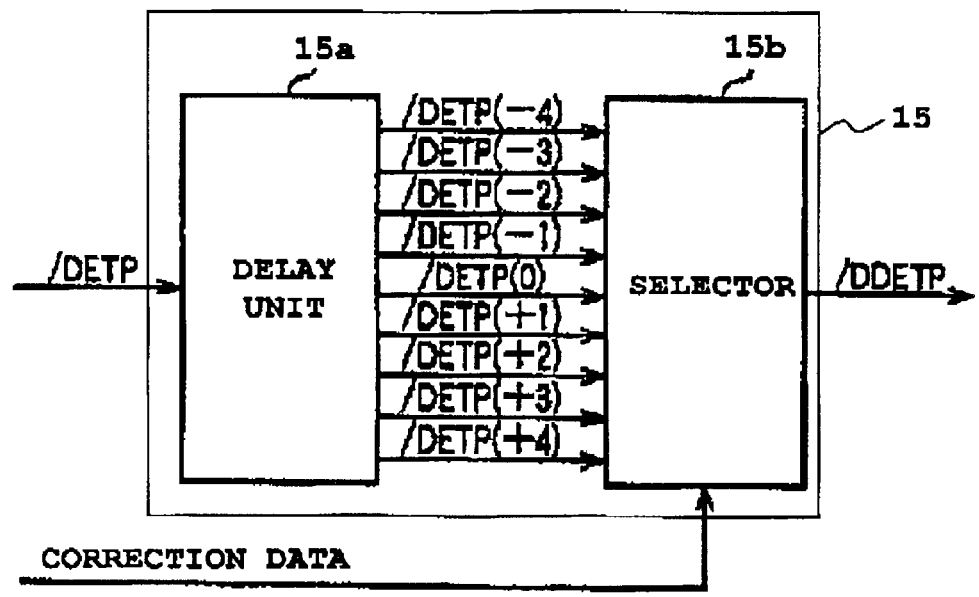
FIG. 5 is a block diagram of a write start position correction unit used in the image recording controlling circuit of FIG. 4.
Figure 6:
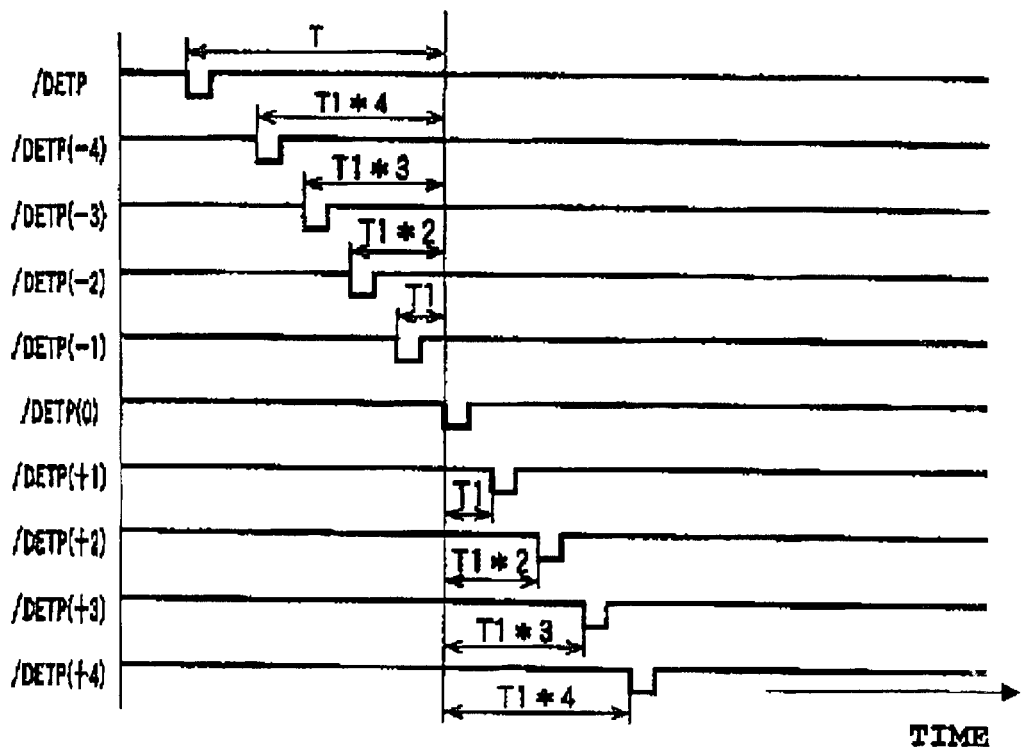
FIG. 6 is a time chart of signals output from a delay unit of the write start position correction unit of FIG. 5.

FIG. 5 shows an exemplary structure of the write start position correction unit 15 of FIG. 4. In FIG. 5, the write start position correction unit 15 includes a delay unit 15a and a selector 15b. The delay unit 15a delays/advances the sync detect signal /DETP, and the selector 15b selects an amount of correction with respect to the start position of image writing based on correction data sent from the controller 19, depending upon the light amount data determined under various image forming conditions. In this example, the correction is made in steps of a ¼ of a dot up to ±1 dot. A time chart corresponding to this case is shown in FIG. 6.

However, it is not possible to advance the timing of the sync detect signal /DETP to move up the start position of the image writing. Therefore, even when the start position of the image writing is not corrected, the delay unit 15a generates a signal /DETP(0) that is delayed by a time T compared to the sync detect signal /DETP and uses this signal /DETP(0)

as a reference signal to determine an amount of time adjustment for advance or delay. The selector 15b selects and outputs one of signals /DETP(−4) to /DETP(+4) with reference to the correction data so that the image forming is performed from the appropriate start position of the image writing. Thus, the time T is determined such that the correction is made up to ±1 dot, as described above. However, it is noted that the time T is equal to or greater than a time corresponding to one dot, i.e., a time of T1 multiplied by 4, where T1 is a time corresponding to a ¼ of a dot.

That is, the delay unit 15a delays the sync detect signal /DETP by a time of T−(T1×4) to generate the signal /DETP(−4). Likewise, it generates /DETP(−3) with a delay of T−(T1×3), /DETP(−2) with a delay of T−(T1×2), /DETP(−1) with a delay of T−(T1×1), /DETP(0) with a delay of T, /DETP(+1) with a delay of T+(T1×1), /DETP(+2) with a delay of T+(T1×2), /DETP(+3) with a delay of T+(T1×3), and /DETP(+4) with a delay of T+(T1×4). These generated signals are sent to the selector 15b, which then selects and outputs one of them in accordance with the correction data sent from the controller 19. With this output, the image writing is performed from the appropriately adjusted start position in the main scanning direction irrespective of the environmental conditions that affect the amount of light detected by the optical sensor.

Figure 7:
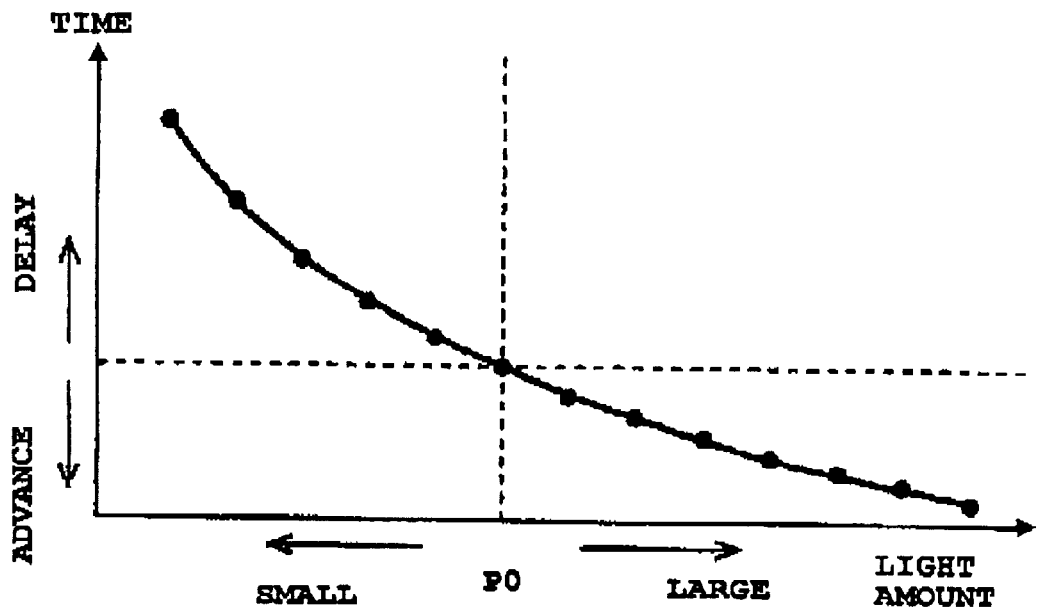
FIG. 7 is a graph showing a relationship between a light amount emitted from a laser unit and an amount of time shift of the sync detect signal produced by the deviation of the light amount from a predetermined value.

FIG. 7 shows a graph of the timing of the sync detect signal /DETP varying in response to the information data corresponding to the various light amounts. In FIG. 7, P0 represents the reference light amount at which the position of each of the four color images are justified in the main scanning direction, i.e., the image recording for each color starts at the same starting position on the photosensitive member 29. When the light amount is increased relative to the reference light amount P0, the timing of the sync detect signal /DETP is moved up and the start position of the image writing is shifted towards the default start position of the image writing. On the contrary, when the light amount is decreased relative to the reference light amount P0, the timing of the sync detect signal /DETP is delayed and the start position of the image writing is shifted towards the end position of the image writing. These characteristics are measured and recorded before the image forming apparatus is used and the characteristics are implemented into the data table that stores a relationship between the amount of the timing correction and the light amount measured. That data table is prestored in the controller 19. The amounts of the timing correction represented in the data table of the delay unit 15a correspond to the delay amounts of the signals /DETP(−4), /DETP(−3), /DETP(−2), /DETP(−1), /DETP(0), /DETP(+1), /DETP(+2), /DETP(+3), and /DETP(+4) relative to the signal /DETP(0).

Figure 8:
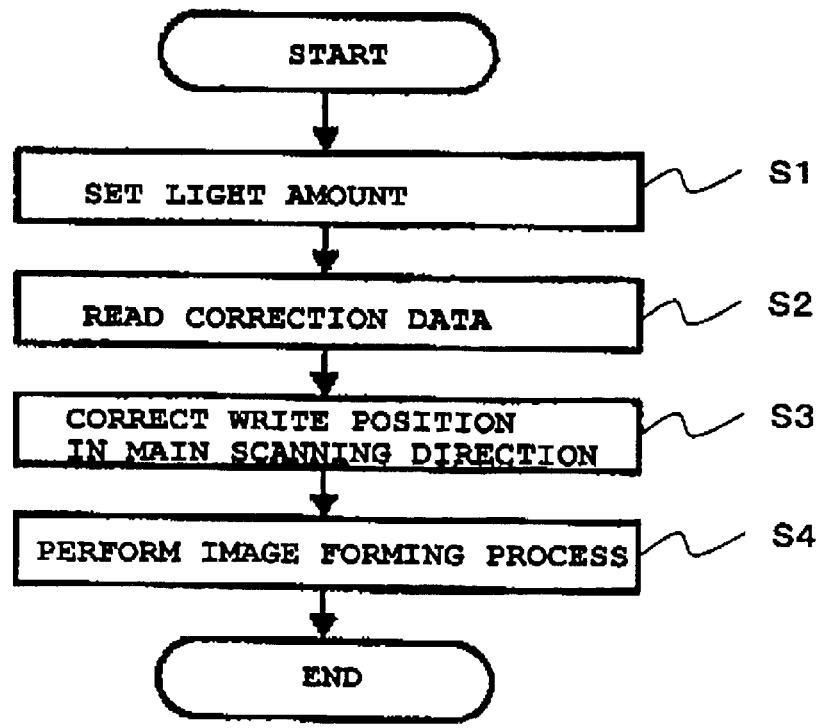
FIG. 8 is a flowchart showing an exemplary procedure of an image forming operation including a correction of the write start position performed by the image recording controlling circuit of FIG. 4.

FIG. 8 is a flowchart of an exemplary procedure of an image forming operation including the above-described start position correction. This procedure is performed for at least one color or for every color in a similar manner.

To perform the start position correction according to the flowchart, the following correction data table is needed to be prestored in the circuit 19a provided by the controller 19.

Correction Data Table

| Predetermined light amount P | Correction data |
| --- | --- |
| $A \leq P \leq B$ | −4 |
| $B \leq P < C$ | −3 |
| $C \leq P < D$ | −2 |
| $D \leq P < E$ | −1 |

-continued

Correction Data Table

| Predetermined light amount P | Correction data |
| --- | --- |
| $E \leq P < F$ | 0 |
| $F \leq P < G$ | +1 |
| $G \leq P < H$ | +2 |
| $H \leq P < I$ | +3 |
| $I \leq P \leq J$ | +4 |

In the above correction data table, the predetermined light amount P has a certain range that is narrowed as a unit of correction becomes smaller. The above-mentioned reference light amount P0 is included in the determined light amount range of $E \leq P < F$.

In the procedure of FIG. 8, the light amount P, which is to be emitted from the laser diode to write an image, is predetermined in the LD driver 11, in step S1. The determined light amount may differ depending upon various print modes and resolutions to be selected as the conditions of the image forming, and therefore it should be determined before the operations of the image forming are performed.

Then, the correction data corresponding to the determined light amount P is read from the correction data table stored in the circuit 19a of the controller 19 and is set in the selector 15b of the write start position correction unit 15, in step S2. When the predetermined light amount P is in the range of $G \leq P < H$, for example, the write start position correction unit 15 selects the correction data of +2, i.e., /DETP(+2), with the selector 15b to correct the sync detect signal /DETP to the main scanning sync signal /DDETP, thereby correcting the start position of the image writing, in step S3. The clock signal VCLK is generated in synchronism with the main scanning sync signal /DDETP, and the LD 10 is driven in synchronism with the clock signal VCLK in accordance with the input image data to start the image forming operation, in step S4.

In this example, a smallest unit of the correction amount is set to be a ¼ of a dot. If this smallest unit of the correction amount is made even smaller (e.g., a ⅛ of a dot), an accuracy of correction is increased with a decrease of errors and, as a result, a deviation of the image is reduced. However, if an attempt to increase the accuracy of correction is made without changing the correction range (e.g., ±1 dot), both the delay unit 15a and the correction table in the controller 19 are required to be added with various factors.

In this example, the correction of the start position of the image writing is performed by the mechanism handling each color. As an alternative, it is possible to correct the start position of the image writing based on a difference of the light amount between a reference color, for example, the black color and the other colors. In this case, a correction is not made for the reference black color image and accordingly the delay unit 15a and the correction table of the controller 19 for the correction of the black color image are not needed. Thus, the related circuits may be simplified. In addition, since the number of the colors to be corrected is reduced, the deviation of the color images is correspondingly reduced. For the colors to be corrected, differences of the light amount relative to the light amount of the common black color, instead of the light amounts of their own reference color, are registered in the correction data table. In this alternative case, when the light amount is changed, the black color image itself is not justified. Consequently, the position of the reference black color image may deviate.

However, a deviation of an image from its absolute position by a few dots may not affect an image quality.

Further, it is also possible to combine the above-described correction of the write start position with other ways of correction of the write start position such as forming an actual color image as an adjustment pattern on the photosensitive member. In this case, the light amount used in forming the adjustment pattern is used as the reference light amount P0 and the correction of the write start position is subsequently performed as described above. In this case, the correction data table is prepared based on the light amount used during the adjustment of other write start position corrections.

The correction of the write start position with the correction data table may allow deviations of the absolute position over time. However, when the correction of the write start position with the correction data table is combined with another adjustment capable of adjusting the deviations of the absolute position, the write start position of the reference color can be justified based on a justified absolute position.

Figure 9:
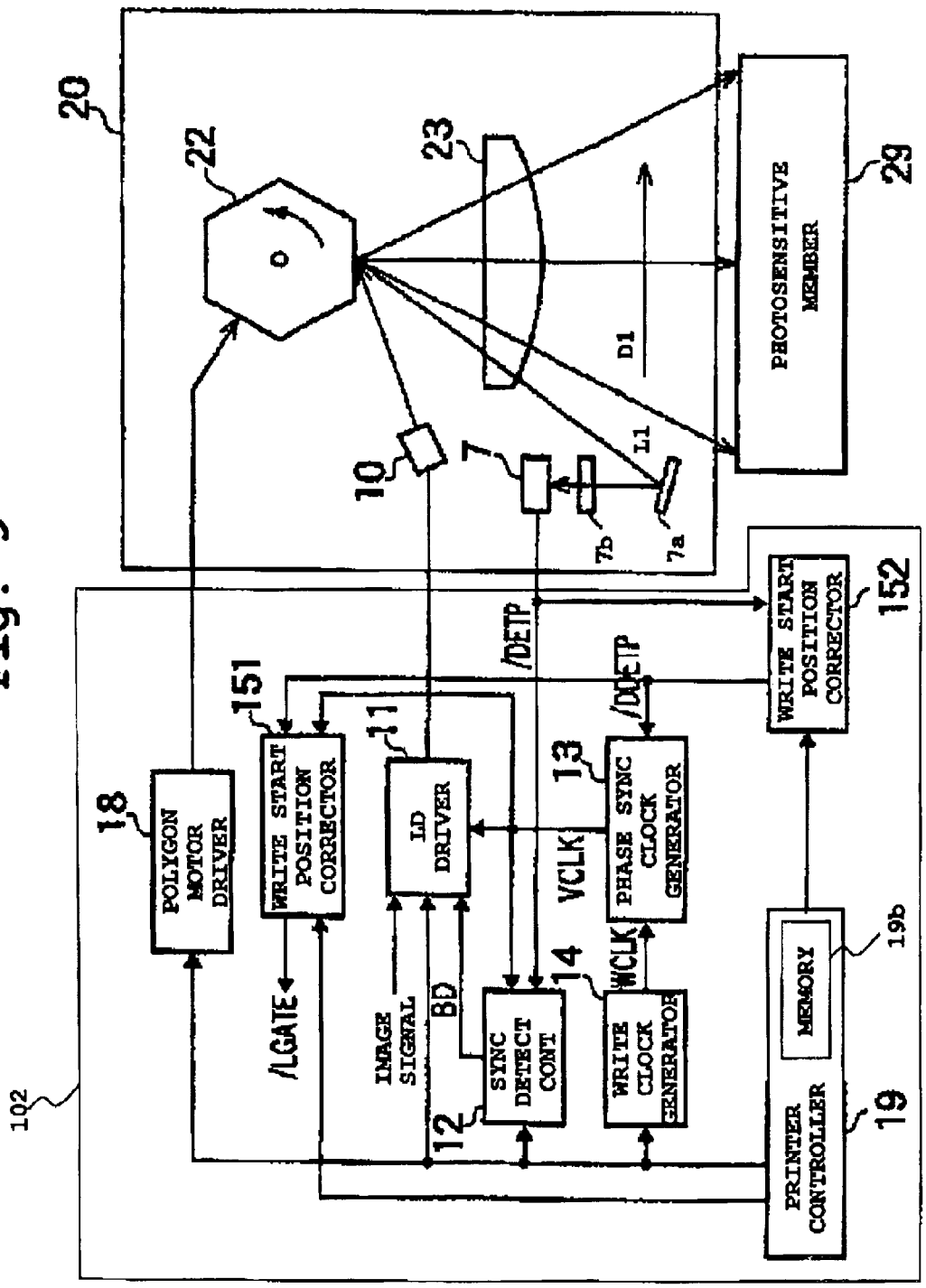
FIG. 9 is a block diagram of another image recording controlling circuit connected to the optical unit.

Next, a modified image recording controlling circuit 102 based on the image recording controlling circuit 2 of FIG. 4 is explained with respect to FIG. 9. FIG. 9 shows an image recording controlling circuit 102 connected to the corresponding optical unit 20 for handling information data corresponding to one color. A similar configuration is provided to handle each of the remaining colors. The image recording controlling circuit 102 of FIG. 9 is similar to the image recording controlling circuit 2 of FIG. 4 in having the correction data table of the determined light amounts and the corresponding shift amounts of the write start position, but is improved in having a greater correction range without scaling up the circuit. More specifically, the image recording controlling circuit 102 is provided with two stages of adjustments performed in a pixel dot and in an amount smaller than a dot. These two adjustments are independently performed with reference to respective correction data tables. For this, the controller 19 is provided with a circuit 19b for storing the two predetermined correction data tables, explained later.

A difference in the configuration of FIG. 9 from that of FIG. 4 is the write start position correction units 151 and 152. The configuration and operations of the illustrated optical unit 20 are similar as in the above description made with reference to FIG. 4.

As described above, the image recording controlling circuit 102 includes the two stages of adjustments performed in a pixel dot and in an amount smaller than a dot. That is, the write start position connection units 151 and 152 are configured to operate under control of the controller 19 in association with the sync detect controller 12, the phase sync clock generator 13, and the write clock generator 14. The LD driver 11 is configured to control the light emission from the LD unit 10 in accordance with the input image data, in the same way as described with reference to FIG. 4.

In FIG. 9, each of the sync detect controller 12 and the write start position correction unit 152 receives a sync detect signal /DETP sent by the sensor 7 based on the scanning light beam L1 emitted from the LD unit 10. The write start position correction unit 152 performs the correction of the write start position in a unit of an amount smaller than a pixel dot in the main scanning direction based on the sync detect signal /DETP. Then, the write start position correction unit 151 receives the adjusted sync signal /DDETP from the write start position correction unit 152 and further adjusts this signal /DDETP in a unit of a pixel dot to generate a signal /LGATE for determining the timing of loading the input image signal in the main scanning direction. Thus, the write start position in the main scanning direction is corrected.

Figure 10:
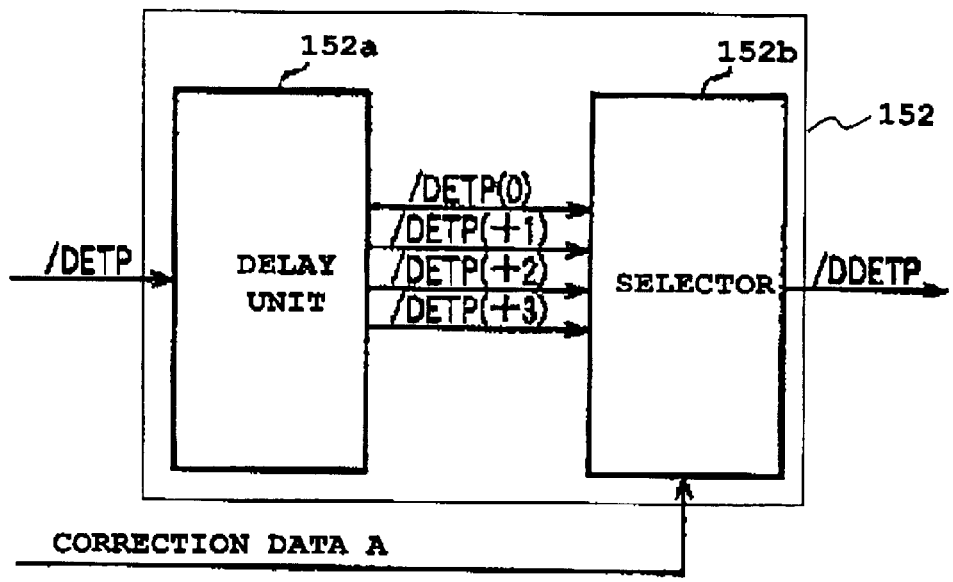
FIG. 10 is a block diagram of a first write start position correction unit used in the image recording controlling circuit of FIG. 9.
Figure 11:
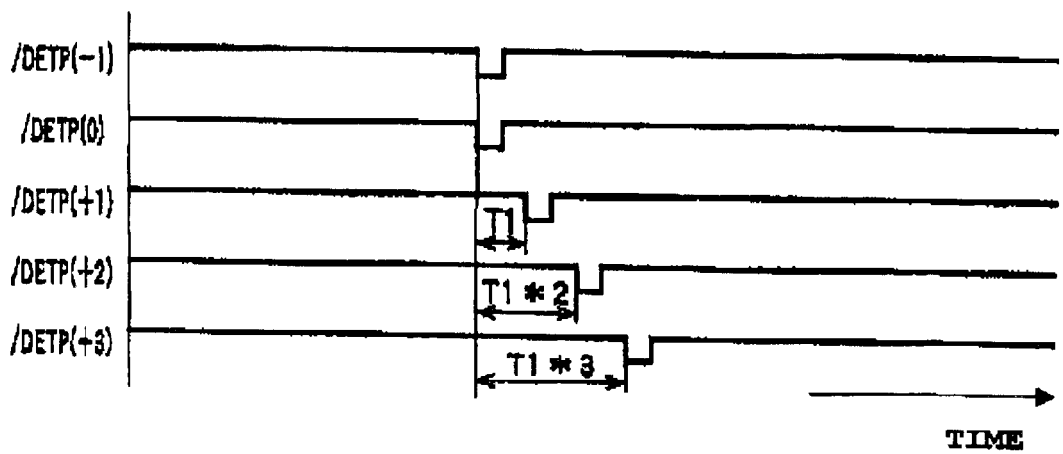
FIG. 11 is a time chart of signals output from a delay unit of the first write start position correction unit of FIG. 10.

FIG. 10 shows an exemplary structure of the write start position correction unit 152. As in the case of the write start position correction unit 15 of FIG. 4, the write start position correction unit 152 includes a delay unit 152a and a selector 152b. In this example, the write start position correction unit 152 handles the correction in a unit of an amount smaller than a pixel dot. If the unit is ¼ of a dot, the selector 152b selects one of signals /DETP(0), /DETP(1), /DETP(2), and /DETP(3) with reference to correction data A sent from circuit 19b of the controller 19. As shown in FIG. 10, the write start position correction unit 152 can perform the correction with the same accuracy as the write start position correction unit 15 of FIG. 4 but with four signals instead of eight, /DETP(0) to /DETP(3). A time chart in this case is shown in FIG. 11 in which T1 represents a time corresponding to a ¼ of a dot as in the case of the image recording controlling circuit 2 of FIG. 4.

The operations of the sync detect controller 12 and the phase sync clock generator 13 of FIG. 9 are similar to those of FIG. 4, except for an input from the phase sync clock generator 13 to the write start position correction unit 151. That is, the write start position correction unit 151 is configured to receive the adjusted signal /DDETP from the write start position correction unit 152 and the clock signal VCLK from the phase sync clock generator 13 to generate the line gate signal /LGATE adjusted in units of a pixel dot.

Figure 12:
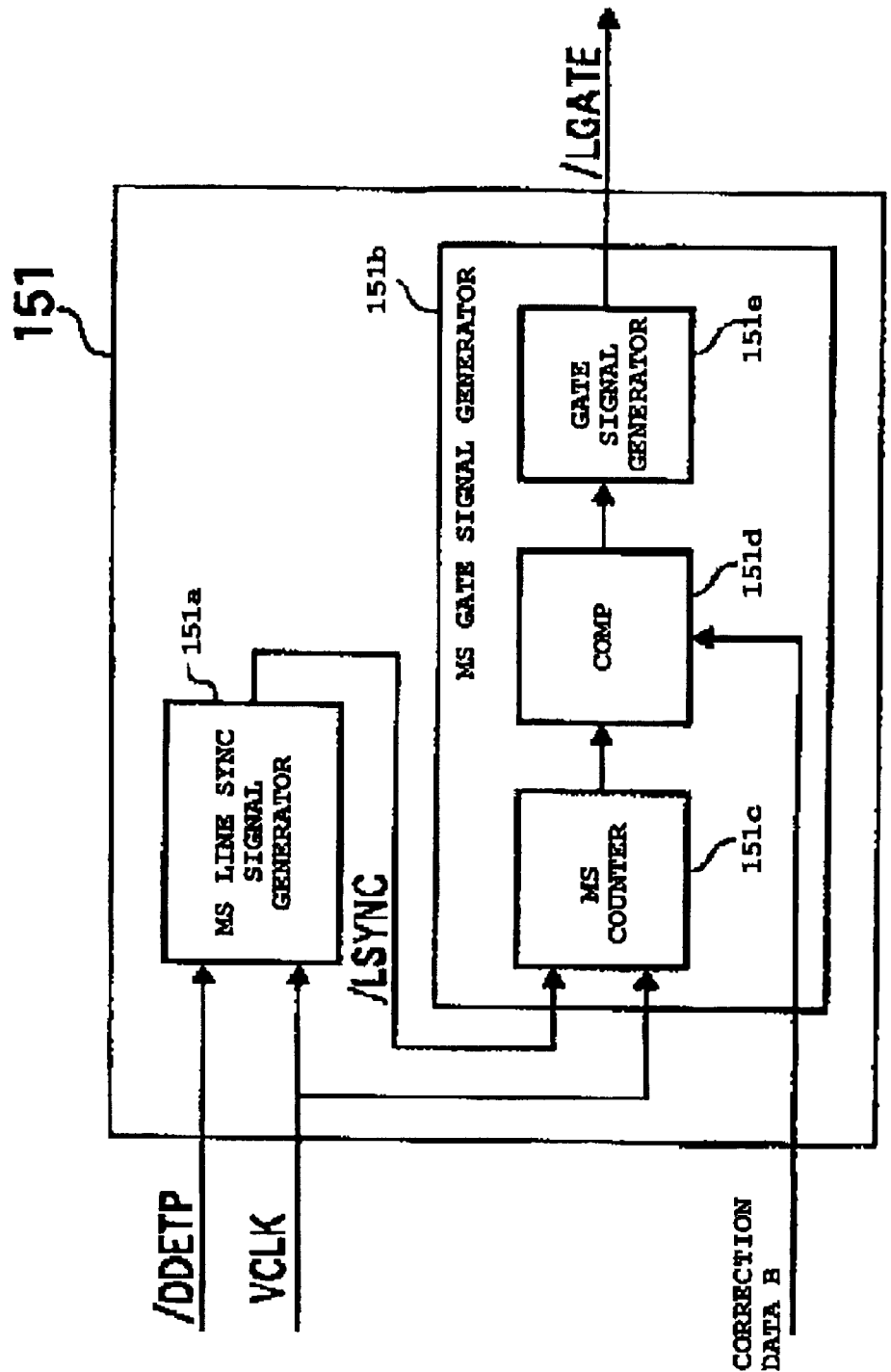
FIG. 12 is a block diagram of a second write start position correction unit used in the image recording controlling circuit of FIG. 9.

FIG. 12 shows an exemplary structure of the write start position correction unit 151. As shown in FIG. 12, the write start position correction unit 151 includes a main scanning (MS) line sync signal generator 151a and a main scanning (MS) gate signal generator 151b. The main scanning gate signal generator 151b includes a main scanning (MS) counter 151c, a comparator (comp) 151d, and a gate signal generator 151e. The main scanning line sync signal generator 151a generates a signal /LSYNC for activating the main scanning counter 151c of the main scanning gate signal generator 151b. The main scanning gate signal generator 151b generates a signal /LGATE for determining the timing of loading the input image signal, that is, the timing of the image recording in the main scanning direction.

In the main scanning signal generator 151b, the main scanning counter 151c counts a number of the signals /LSYNC sent from the main scanning line sync signal generator 151a in synchronism with the clock signal VCLK sent from the phase sync clock generator 13. The comparator 151d compares the counted value output from the main scanning counter 151c with correction data B sent from the circuit 19b of the controller 19. The gate signal generator 151e generates the signal /LGATE based on the signal representing the comparison result sent from the comparator 151d.

Figure 13:
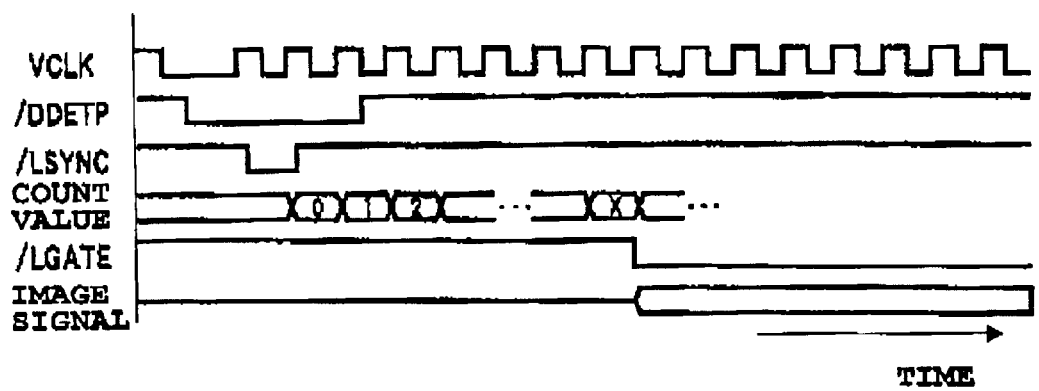
FIG. 13 is a time chart of signals generated by the image recording controlling circuit of FIG. 9.

FIG. 13 shows a time chart of the signals associated with the operations of the write start position correction unit 151. As shown in FIG. 13, the line sync signal /LSYNC resets the main scanning counter 151c, and the main scanning counter 151c then increments its count by one in synchronism with the clock signal VCLK. Subsequently, the comparator 151d compares the count value of the main scanning counter 151c with the correction data B that is prestored in the circuit 19b of the controller 19 according to the image forming conditions. When the count value is equal to the correction data B, the comparator 151d outputs a signal representing the comparison result. The above-mentioned correction data B is the data in a unit of a pixel dot and is represented by X in this case, as shown in FIG. 13. The gate signal generator 151e sets the signal /LGATE to its low state upon receiving the signal representing an event that the count value is X from the comparator 151d. The signal /LGATE is the signal made low during the time covering the width of the image area in the main scanning direction.

In this way, the line gate signal /LGATE for controlling the loading of the input image signal is corrected with the correction data B that is loaded with the count value of the main scanning counter 151c in synchronism with the clock signal VCLK having a cycle in a unit of pixel. Therefore, a circuit for controlling an output timing of the image signal using the line gate signal /LGATE is needed at a stage before the image recording controlling circuit 102 of FIG. 9 is used. This circuit may be implemented by a line memory 17, for example, as shown in FIG. 14.

Figure 14:
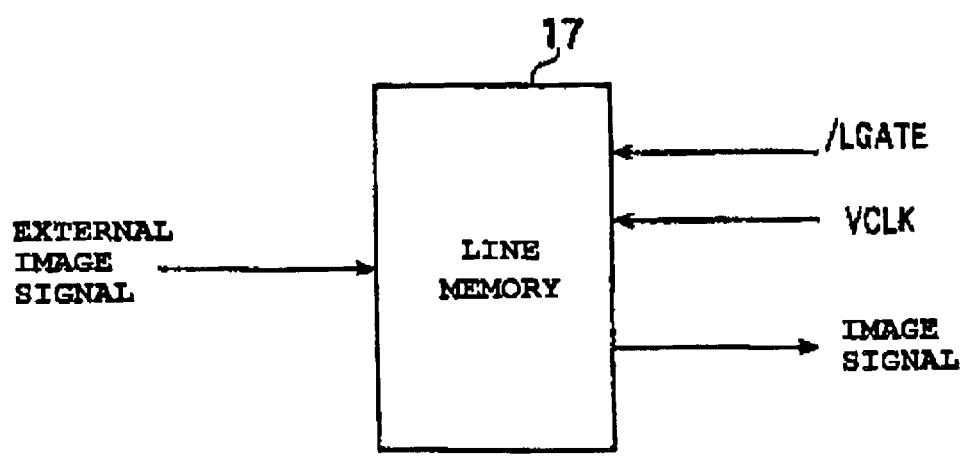
FIG. 14 is a line memory to be used in the image recording controlling circuit of FIG. 9.

The line memory 17 of FIG. 14 is configured to output image data that is loaded from an external apparatus such as a frame memory, a scanner, or the like in synchronism with the clock signal VCLK during the time the line gate signal /LGATE is in its low state. Accordingly, the image signal loaded with the output timing that the line gate signal /LGATE is low drives the LD driver 11 to turn on and off the LD unit 10.

Thus, the correction data A and B prestored in the circuit 19b of the controller 19 are changed in the write start position correction units 152 and 151, respectively, to include the timing of the line gate signal /LGATE in the correction amount in two stages in units of a pixel dot and an amount smaller than a pixel dot.

The image recording controlling circuit 102 controls the procedure of the image forming including the correction of the write start position in substantially the same manner as that shown in FIG. 8. However, to control such procedure as shown in FIG. 8, the following correction data table is needed to be prestored in the circuit 19b of the controller 19 of the image recording controlling circuit 102.

Correction Data Table

| Predetermined light amount P | Correction data A | Correction data B |
|---|---|---|
| A ≦ P ≦ B | 0 | −1 |
| B ≦ P < C | +1 | −1 |
| C ≦ P < D | +2 | −1 |
| D ≦ P < E | +3 | −1 |
| E ≦ P < F | | 0 |
| F ≦ P < G | +1 | 0 |
| G ≦ P < H | +2 | 0 |
| H ≦ P < I | +3 | 0 |
| I ≦ P ≦ J | 0 | +1 |

According to the above correction data table, there are seven combinations, that is, four signals relative to the correction data A (i.e., 0, +1, +2, +3) and three signals relative to the correction data B (i.e., −1, 0, +1), which are less than the example of FIG. 4 that requires nine combinations relative to the correction data (−4, −3, −2, −1, 0, +1, +2, +3, +4). That is, the image recording controlling circuit 102 can perform the correction of the write start position with the same accuracy with less combinations/signals.

The data of the above correction data table is also obtained from the characteristics of FIG. 7, and the reference light amount P0 of FIG. 7 is included in the range of E≦P<F.

Figure 15:
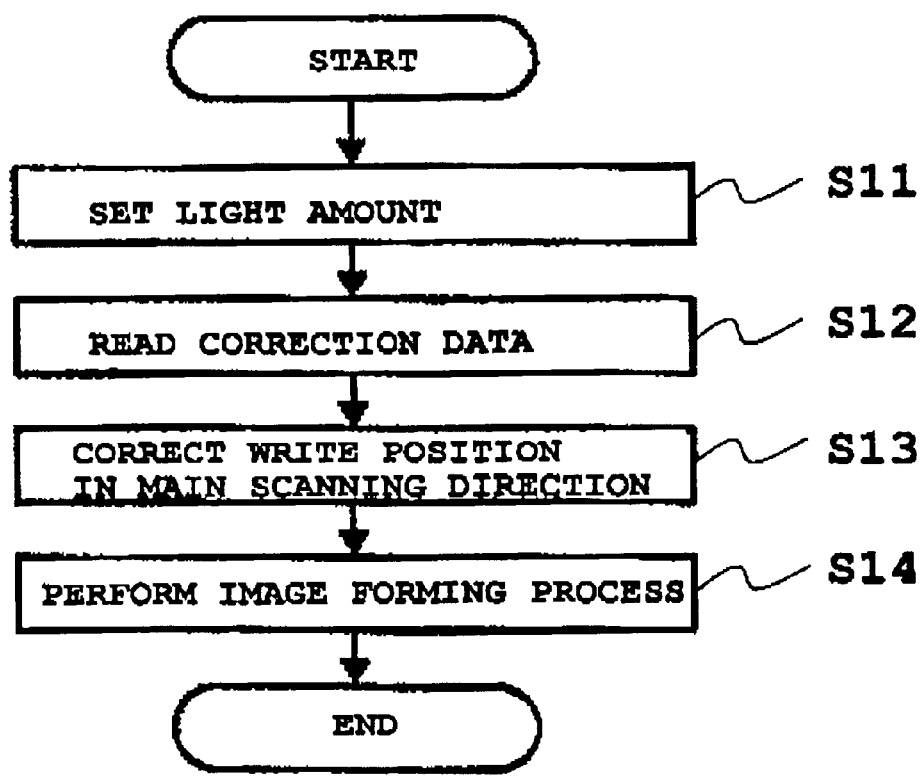
FIG. 15 is a flowchart of an exemplary method for explaining an image forming operation including a correction of the write start position performed by the image recording controlling circuit of FIG. 9.

FIG. 15 shows a flowchart of an exemplary procedure of an image forming operation including the above-described start position correction performed by the image recording controlling circuit 102 of FIG. 9. This procedure is performed for each color in a similar manner. In the procedure of FIG. 8, the light amount P, which is to be emitted from the laser diode to write an image, is determined in the LD driver 11, in step S11. The determined light amount may differ depending upon various print modes and resolutions to be selected as the conditions of the image forming and therefore it should be determined before the operations of the image forming are initiated.

Then, the correction data A and B corresponding to the determined light amount P are read from the correction data table stored in the circuit 19b of the controller 19, in step S12. The correction data A is set in the selector 152b of the write start position correction unit 152 and the correction data B is set in the comparator 151d of the write start position correction unit 151, also in step S12.

In step S13, when the determined light amount P is in the range of C≦P<D, for example, the write start position correction unit 151 selects the correction data B of −1 to justify the main scanning line gate signal /LGATE such that the main scanning line gate signal /LGATE advances by one clock signal VCLK. At the same time, the write start position correction unit 152 selects the correction data A of +2, i.e., /DETP(+2), with the selector 152b to correct the sync detect signal /DETP to the main scanning sync signal /DDETP. Therefore, a total sum of −1+(¼)×2=−½ [dot], that is, the write start position in the main scanning direction is corrected to advance by one half dot. These processes are performed in step S13.

Then, the timing of the main scanning line gate signal /LGATE is adjusted with the correction amount in two stages in units of a pixel dot and in units of an amount smaller than a pixel dot. After that, the LD 10 is driven in accordance with the input image data in response to the main scanning line gate signal /LGATE to start the image forming operation, in step S14.

If the smallest unit of the correction amount is made smaller, an accuracy of the correction is increased with a decrease of errors and, as a result, a deviation of the image is reduced.

Figure 16:
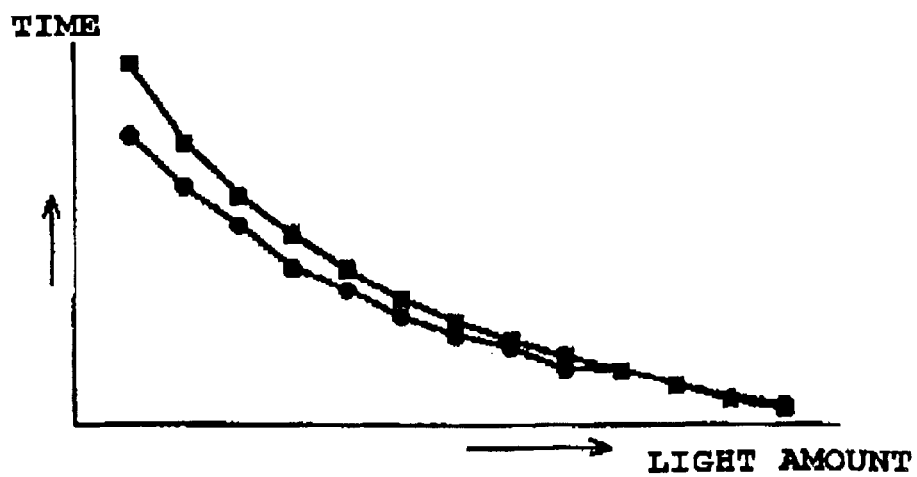
FIG. 16 is a graph showing two different relationships between a light amount emitted from a laser unit and an amount of time shift applied of the sync detect signal.

In the above-described image recording controlling circuits 2 and 102 shown in FIGS. 4 and 9, respectively, their controls rely on the characteristic represented by the timing of the sync detect signal /DETP varying in response to the data of the determined light amount as shown in FIG. 7. However, this characteristic may differ between the image forming apparatuses when the image recording controlling circuit 2 or 102 is affected by variations of the incident light amount into the LD sensor in the optical unit or time variations, for example. FIG. 16 shows a graph of two different characteristics with respect to the timing of the sync detect signal /DETP varying in response to the data of the determined light amount.

Using the above-mentioned graph, it is possible to store in the circuit of the controller 19 of the image recording controlling circuit 2 or 102 two correction data tables that represent, for example, the above-mentioned two characteristics shown in FIG. 16 so that the image recording controlling circuit 2 or 102 can selectively use these two correction data tables according to various conditions of the image forming apparatus. Of course, more than two correction data tables can be stored in the circuit of the controller 19 for a more precise selection. To select one of the correction data tables, an operator may reproduce an actual image output and select the one that has less image deviation.

Figure 17:
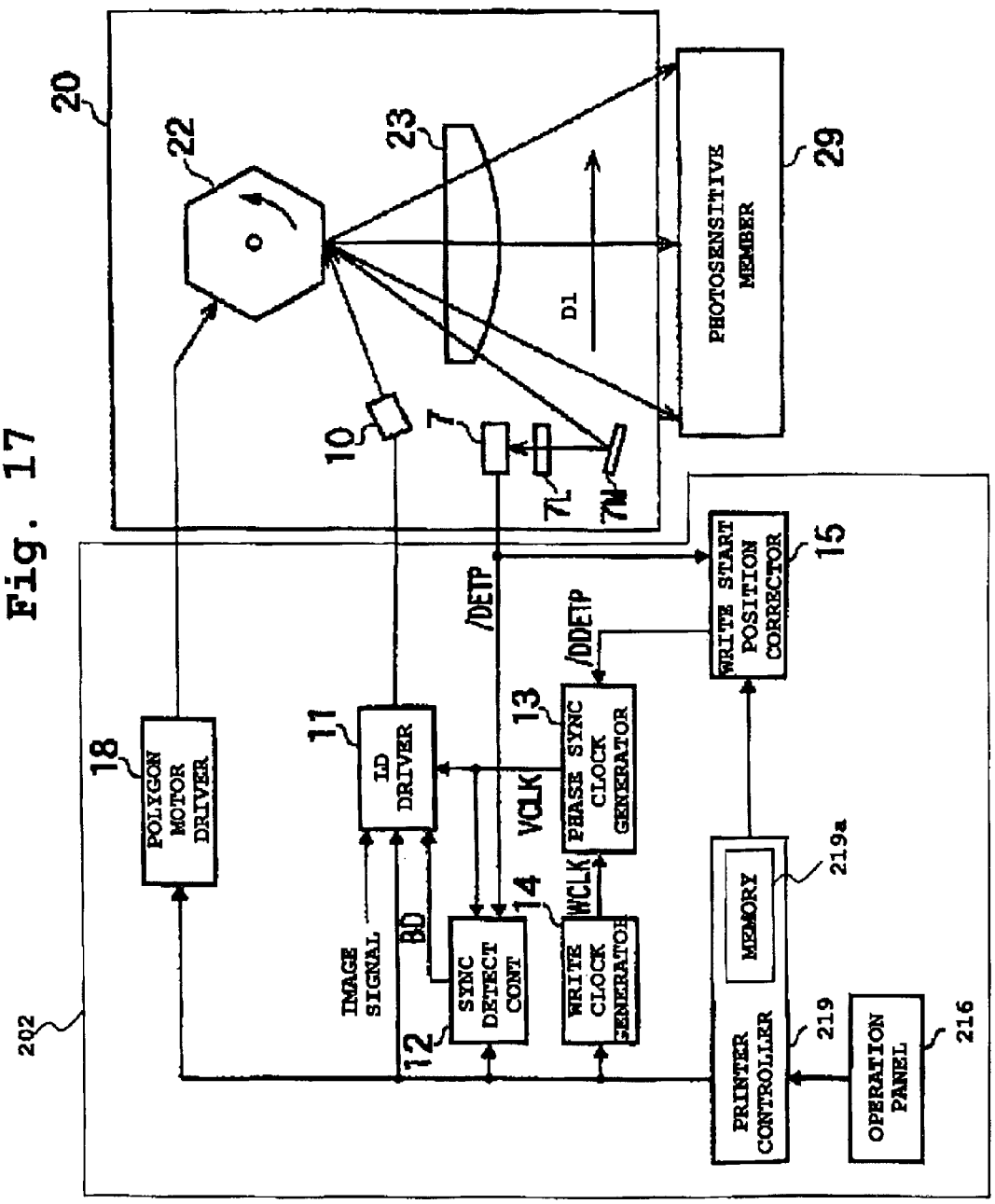
FIG. 17 is a block diagram of another image recording controlling circuit connected to the optical unit.

FIG. 17 shows an image recording controlling circuit 202 modified based on the image recording controlling circuit 2 of FIG. 4. FIG. 17 shows an image recording controlling circuit 202 connected to the optical unit 20 for handling information data from one color information data. A similar configuration is provided to handle each of the remaining colors. The image recording controlling circuit 202 of FIG. 17 is similar to the image recording controlling circuit 2 of FIG. 4, except for a controller 219 and an operation panel 16. The controller 219 is provided with a circuit 219a to store a plurality of the correction data tables of the determined light amounts and the corresponding shift amounts of the write start position, as described above with reference to FIG. 16. The operation panel 216 is provided with a function for allowing the operator to select a preferable correction data table from the plurality of correction data tables. Thereby, the operator can easily change the correction data table from one set to another to suitably correct an image deviation whenever the operator finds an image deviation.

Figure 18:
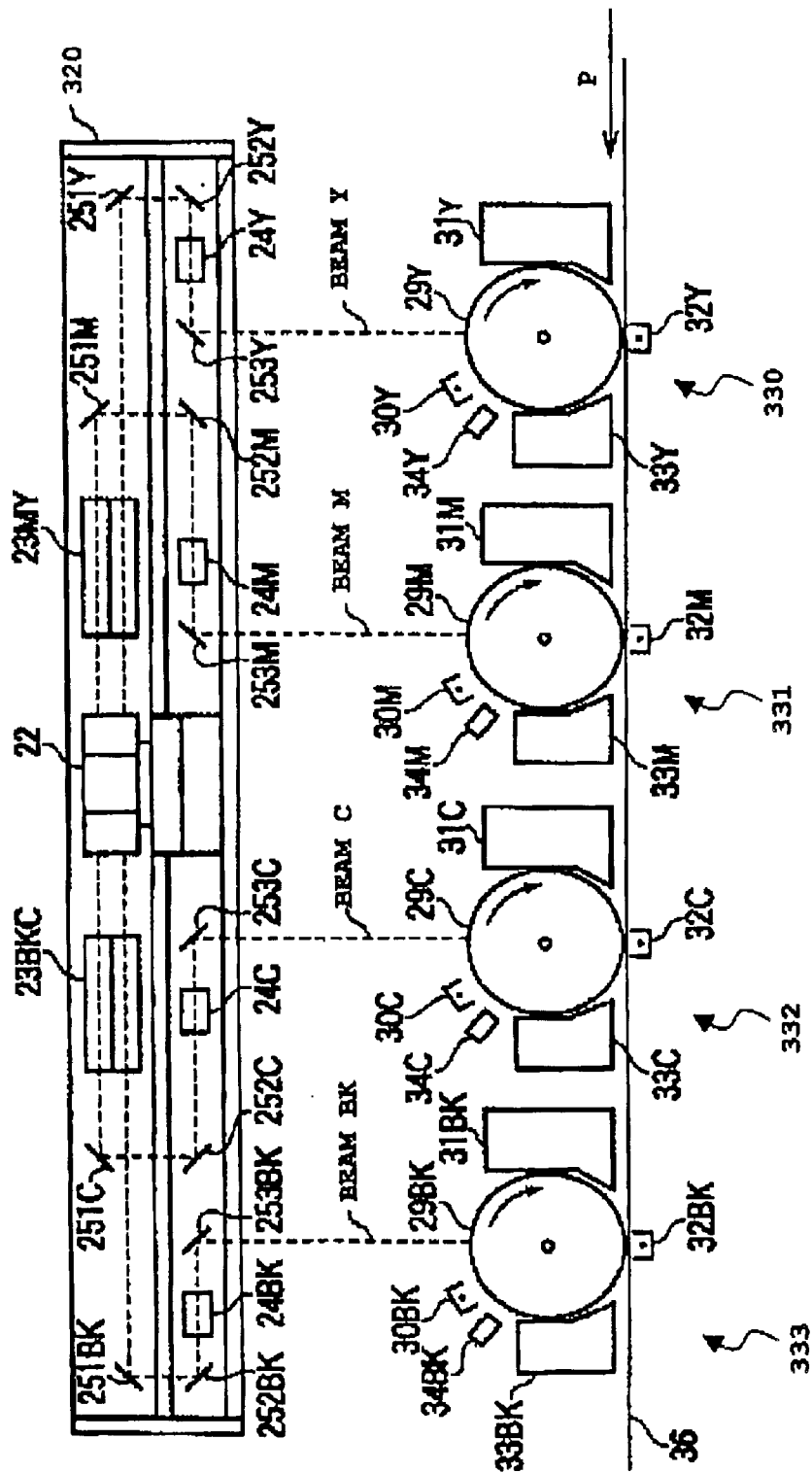
FIG. 18 is a schematic illustration showing an exemplary structure of a main part of an image fixing apparatus having a common polygon mirror and four color-independent image forming mechanisms according to a preferred embodiment of the present invention.

Next, an image forming apparatus 300 that has a common polygon mirror and four color-independent drums is explained with reference to FIGS. 18 and 19. FIG. 18 shows an optical unit 320 and four image forming mechanisms 330–333 of the image forming apparatus 300. As shown in FIG. 18, the optical unit 320 includes the polygon mirror 22 that is shared by the four image forming mechanisms 330–333. The polygon mirror 22 separately deflects the light beams of yellow (Y), magenta (M), cyan (C), and black (BK) using its opposing sides and having upper and lower sides, as shown in FIG. 18. For example, the yellow light beam (i.e., beam Y) passes through an fθ (ef-theta) lens 23MY after being deflected by the polygon mirror 22, and is deflected by a mirror 251Y. Then, the yellow light beam is deflected by a mirror 252Y and passes through a barrel toroidal lens (BTL) 24Y. After that, the yellow light beam is deflected by a mirror 253Y and impinges on a photosensitive member 29Y.

Likewise, the magenta light beam (i.e., beam M) passes through an fθ (ef-theta) lens 23MY after being deflected by the polygon mirror 22, and is deflected by a mirror 251M. Then, the magenta light beam is deflected by a mirror 252M and passes through a barrel toroidal lens (BTL) 24M. After that, the magenta light beam is deflected by a mirror 253M and impinges on a photosensitive member 29M.

The cyan light beam (i.e., beam C) passes through an fθ (ef-theta) lens 23BKC after being deflected by the polygon mirror 22, and is deflected by a mirror 251C. Then, the cyan light beam is deflected by a mirror 252C and passes through a barrel toroidal lens (BTL) 24C. After that, the cyan light beam is deflected by a mirror 253C and impinges on a photosensitive member 29C.

The black light beam (i.e., beam BK) passes through an fθ (ef-theta) lens 23BKC after being deflected by the polygon mirror 22, and is deflected by a mirror 251BK. Then, the black light beam is deflected by a mirror 252BK and passes through a barrel toroidal lens (BTL) 24BK. After that, the black light beam is deflected by a mirror 253BK and impinges on a photosensitive member 29BK.

Thus, the four color light beams are separately deflected by a common polygon mirror (i.e., the polygon mirror 22) and are brought to scan the respective photosensitive members. The image forming mechanisms 332–333 have structures substantially the same as those explained with reference to FIGS. 2 and 3.

Figure 19:
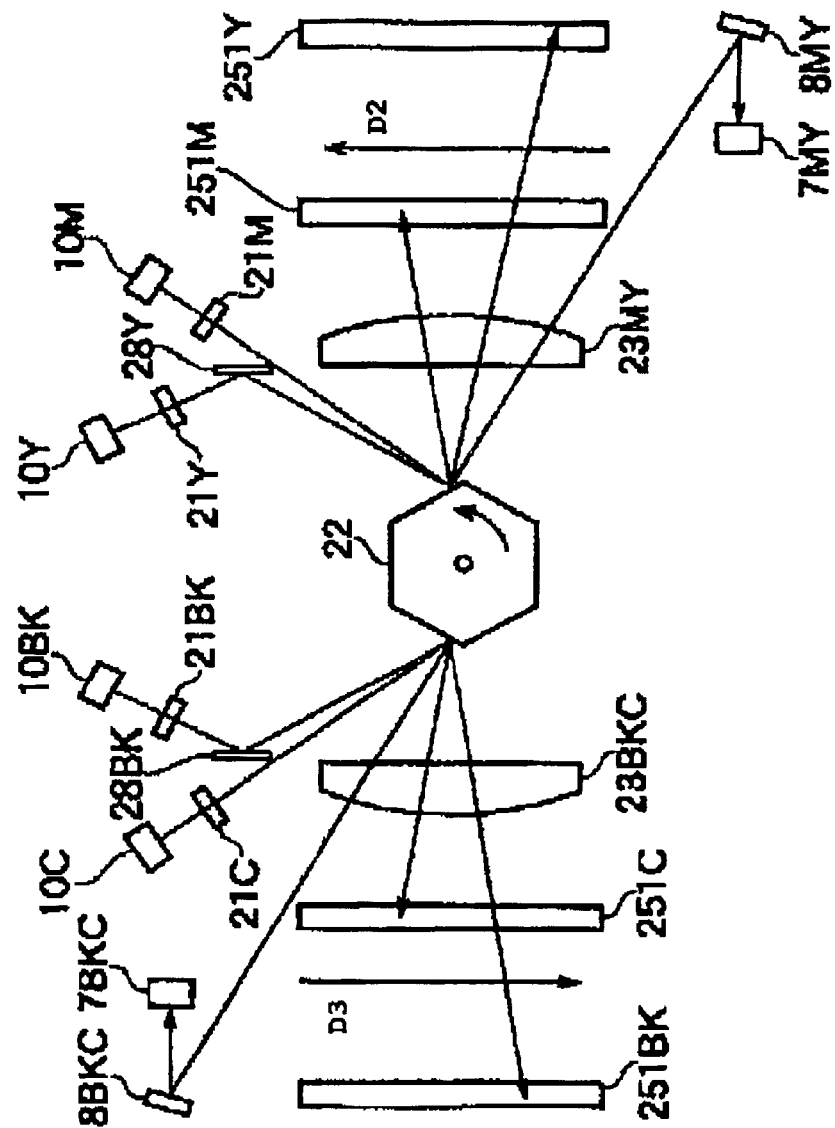
FIG. 19 is a top view of the optical unit of FIG. 18 centered on the common polygon mirror.

FIG. 19 is a top view of the optical unit 320 of FIG. 18. As shown in FIG. 19, the yellow light beam emitted from LD (laser diode) unit 10Y passes through a cylinder lens 21Y and is deflected by a mirror 28Y. Then, the yellow light beam impinges on a lower side of the polygon mirror 22 and is deflected thereby to sweep a predetermined angle in a main scanning direction D2 towards the photosensitive member 29Y via the fθ lens 23MY, the mirror 251Y, and so on, as described above. After the deflection by the polygon mirror 22, the yellow light beam is initially detected by a sensor 7MY via a cylinder mirror 8MY.

The magenta light beam emitted from LD (laser diode) unit 10M passes through a cylinder lens 21M to impinge on a lower side of the polygon mirror 22. Then, the magenta light beam is deflected by the polygon mirror 22 to sweep a predetermined angle in the main scanning direction D2 towards the photosensitive member 29M via the fθ lens 23MY, the mirror 251M, and so on, as described above. After the deflection by the polygon mirror 22, the magenta light beam is initially detected by the sensor 7MY via the cylinder mirror 8MY.

The cyan light beam emitted from LD (laser diode) unit 10C passes through a cylinder lens 21C to impinge on a lower side of the polygon mirror 22. Then, the cyan light beam is deflected by the polygon mirror 22 to sweep a predetermined angle in a main scanning direction D3 towards the photosensitive member 29C via the fθ lens 23BKC, the mirror 251C, and so on, as described above. After the deflection by the polygon mirror 22, the cyan light beam is initially detected by a sensor 7BKC via a cylinder mirror 8BKC.

The black light beam emitted from LD (laser diode) unit 10BK passes through a cylinder lens 21BK and is deflected by a mirror 28BK. Then, the black light beam impinges on a lower side of the polygon mirror 22 and is deflected thereby to sweep a predetermined angle in the main scanning direction D3 towards the photosensitive member 29BK via the fθ lens 23BKC, the mirror 251BK, and so on, as described above. After the deflection by the polygon mirror 22, the black light beam is initially detected by the sensor 7BKC via the cylinder mirror 8BKC. The above-mentioned sensors 7MY and 7BKC are the sensor for detecting the sync detect signals of the beams Y, M, C, and BK.

As described above, two light beams share one sync detect sensor. For this case, the two light beams are arranged to enter the polygon mirror with angles slightly different from each other to fall on the single sensor with a slight delay one relative to the other. Thereby, the two light beams detected by the single sensor are easily separated afterwards. It is noted that the direction of the beams BK and C is opposite to that of the beams Y and M in the case shown in FIG. 19.

When the timings of the sync detect signals are changed among the four color signals in the optical unit, the image signal for the four colors are generated in accordance with the changed timings of the sync detect signals. Because of this, a sync detect signal handling circuit initially separates the sync detect signals Y and M from the output signal of one sensor and the sync detect signal BK and C from the output signal of another sensor. This processing can be performed with a sync signal separation circuit in combination with, for example, the write start position correction unit 15 of FIG. 4 or the write start position correction units 151 and 152 of FIG. 9. Such a sync signal separation circuit separates the signals /DETP_BK and /DETP_C and also the signals /DETP_Y and /DETP_M. After the separation, the correction of the write start positions of the four colors can be performed using the circuits similar to those described above with reference to FIGS. 4 and 9.

As an alternative, the optical unit 320 may be provided with four separate sync detect sensors for separately detecting the four colors, in place of the two sensors shown in FIGS. 18 and 19. In this case, the image recording controlling circuit for each color may be identical to the one shown in FIG. 4 or 9.

Numerous additional modifications and variations are possible in light of the above teachings. It is therefore to be understood that within the scope of the appended claims, this disclosure may be practiced otherwise than as specifically described herein.

This patent specification is based on Japanese patent application No. JPAP2001-218993 filed on Jul. 19, 2001 in the Japanese Patent Office, the entire contents of which are hereby incorporated by reference herein.

What is claimed is:

1. An image forming apparatus, comprising:
a photosensitive member;
a light source;
an optical unit configured to scan a surface of the photosensitive member with a light beam produced by the light source;
a sensor disposed at a side of the photosensitive member and configured to detect a light amount of the light beam from the light source at the side of the photosensitive member before the light beam scans an image region in a main scanning direction on the photosensitive member, and the sensor outputs a detected signal based on the detected light beam;
an electronic circuit configured to store data information and to produce a corrected signal based on a stored correction data table including predetermined light amount data of the light source corresponding to various image forming conditions and a start position shift amount data including a plurality of time shift amounts correspounding to the predetermined light amount data; and
a controller unit configured to control a light amount of the light source based on the correction data table, wherein
a start position on the photosensitive member of the light beam produced by the light source is adjusted based on the detected signal and the corrected signal, and
the controller unit is further configured to shift the start position of the light beam on the photosensitive member for image recording when the light amount of the light source detected by the sensor changes from a reference value.

2. An image forming apparatus as in claim 1, wherein the electronic circuit comprises a memory.

3. An image forming apparatus as in claim 1, wherein the controller unit comprises a write start position correction unit configured to shift the start position of the image recording of the light beam on the photosensitive member based on the start position shift amount data from the correction data table.

4. An image forming apparatus as in claim 3, wherein the write start position correction unit shifts the start position of image recording in first and second stages, the first stage shifting the start position by a unit of a pixel dot, and the second stage shifting the start position by a unit smaller than a pixel dot.

5. An image forming apparatus as in claim 4, wherein the write start position correction unit generates a timing signal for determining a timing to load the image data.

6. An image forming apparatus as in claim 4, wherein the write start position correction unit shifts the start position of the image recording based on a difference of light amount between an actual light and a predetermined reference light.

7. An image forming apparatus as in claim 4, wherein the write start position correction unit shifts the start position of the image recording based on a difference of light amount between an actual light and a reference light that is determined when a write start position in the main scanning direction on the photosensitive member is adjusted through an image forming onto the photosensitive member.

8. An image forming apparatus as in claim 1, wherein the start position shift amount data stored in the electronic circuit is changed.

9. An image forming apparatus as in claim 1, wherein the electronic circuit prestores a plurality of different correction data tables each including light amount data of the light source determined under various image forming conditions and corresponding start position shift amount data.

10. An image forming apparatus as in claim 9, further comprising an operator input mechanism configured to allow an operator to input an instruction to select one of the plurality of different correction data tables.

11. An image forming apparatus as in claim 1, further comprising an image forming mechanism for yellow, magenta, cyan, and black color images, wherein the image forming mechanism includes the photosensitive member, the light source, the optical unit, the sensor, the electronic circuit, and the controller unit.

12. An image forming apparatus as in claim 11, wherein the optical systems of the image forming mechanisms for yellow, magenta, cyan, and black colors share a common polygon mirror.

13. An image forming apparatus as in claim 11, wherein the image forming mechanism adjusts the start position of the photosensitive member for light beams corresponding to yellow, magenta, cyan, and black information data.

14. An image forming apparatus as in claim 11, wherein the image forming mechanism comprises at least four image forming mechanisms, each image forming mechanism producing an image in one color.

15. An image forming apparatus as in claim 14, wherein the correction data table for each color is predetermined relative to a reference value.

16. An image forming apparatus as in claim 14, wherein a predetermined value of the light amount for one color constitutes a reference value and other correction data tables for remaining colors are predetermined relative to the reference color.

17. An image forming apparatus as in claim 1, wherein the corrected signal has a constant time duration under various image forming conditions.

18. An image forming apparatus as in claim 1, wherein the controller unit further includes another write start position correction unit so that said write start position correction unit shifts the start position of the image recording by one of a unit of a pixel dot and a unit smaller than a pixel dot, and the other write start position correction unit shifts the start position of the image recording by the other unit of a pixel dot and a unit smaller than a pixel dot.

19. An image forming apparatus, comprising:
photosensitive means for producing an image;
light source means for generating a light beam;
optical means for scanning a surface of the photosensitive means with the light beam produced by the light source means;

sensing means disposed at a side of the photosensitive means for detecting the light beam from the light source means at the side of the photosensitive means before the light beam scans an image region in a main scanning direction on the photosensitive means, and the sensing means outputs a detected signal;

storage means for storing data information and for producing a corrected signal based on a correction data table including predetermined light amount data of the light source corresponding to various image forming conditions and a start position shift amount data including a plurality of time shift amounts corresponding to the predetermined light amount data; and control means for controlling a light amount of the light source means based on the correction data table, wherein a start position on the photosensitive means of the light beam produced by the light source means is adjusted based on the detected signal and the corrected signal, and the control means shifts the start position of the light beam on the photosensitive means for image recording when the light amount of the light source means detected by the sensing means changes from a reference value.

20. An image forming apparatus as in claim 19, wherein the storage means comprises a memory.

21. An image forming apparatus as in claim 19, wherein the control means comprises write start position means for shifting the start position of the image recording of the light beam on the photosensitive means based on the start position shift amount data from the correction data table.

22. An image forming apparatus as in claim 19, wherein the write start position means shifts the start position of image recording in first and second stages, the first stage shifting the start position by a unit of a pixel dot, and the second stage shifting the start position by a unit smaller than a pixel dot.

23. An image forming apparatus as in claim 22, wherein the write start position means shifts the start position of the image recording based on a difference of the light amount between an actual light and a predetermined reference light.

24. An image forming apparatus as in claim 22, wherein the write start position means shifts the start position of the image recording based on a difference of the light amount between an actual light and a reference light that is determined when a write start position in the main scanning direction on the photosensitive means is adjusted through an image forming onto the photosensitive means.

25. An image forming apparatus as in claim 19, wherein the write start position means generates a timing signal for determining a timing to load the image data.

26. An image forming apparatus as in claim 19, wherein the storage means prestores a plurality of different correction data tables each including light amount data of the light source determined under various image forming conditions and corresponding start position shift amount data.

27. An image forming apparatus as in claim 26, further comprising operator input means for allowing an operator to input an instruction to select one of the plurality of different correction data tables.

28. An image forming apparatus as in claim 19, further comprising image forming means for yellow, magenta, cyan, and black color images, wherein the image forming means includes the photosensitive means, the light source means, the optical means, the sensing means, the storage means, and the control means.

29. An image forming apparatus as in claim 28, wherein the optical means of the image forming means for yellow, magenta, cyan, and black colors share a common polygon mirror means.

30. An image forming apparatus as in claim 28, wherein the image forming means adjusts the start position of the photosensitive means for light beams corresponding to yellow, magenta, cyan, and black information data.

31. An image forming apparatus as in claim 28, wherein the image forming means comprises at least four image forming means, each image forming means producing an image in one color.

32. An image forming apparatus as in claim 31, wherein the correction data table for each color is predetermined relative to a reference value.

33. An image forming apparatus as in claim 31, wherein a predetermined value of the light amount for one color constitutes a reference value and other correction data tables for remaining colors are predetermined relative to the reference color.

34. An image forming apparatus as in claim 19, wherein the corrected signal has a constant time duration under various image forming conditions.

35. An image forming apparatus as in claim 19, wherein the control means further includes another write start position correction means so that said write start position correction means shifts the start position of the image recording by one of a unit of a pixel dot and a unit smaller than a pixel dot, and the other write start position correction means shifts the start position of the image recording by the other unit of a pixel dot and a unit smaller than a pixel dot.

36. An image forming apparatus, comprising:

at least one image forming mechanisms configured to form an image based on image data, said image forming mechanism comprising:

an optical system configured to scan a surface of a photosensitive member with a light beam emitted from a light source based on said image data, a sensor arranged at a predetermined position relative to the photosensitive member and configured to detect the light beam at an initial side before an image region on a scanning line in a main scanning direction and to output a sync detect signal, a memory configured to stop a correction data table including predetermined light amount data of the light source corresponding to various image forming conditions and corresponding to start position shift amount including a plurality of time shift amounts corresponding to the predetermined light amount data, and a controller unit configured to control a light amount of the light source according to image forming conditions and to determine a start position of an image recording based on the sync detect signal detected by the sensor, wherein the controller includes a write start position correction unit configured to shift the start position of the image recording based on a start position shift amount data from the correction data table when the light amount of the light source is changed under various image forming conditions.

37. An image forming apparatus as in claim 36, wherein the write start position correction unit shifts the start position of the image recording in first and second stages according to a unit of a pixel dot and a unit smaller than a pixel dot, respectfully.

38. An image forming apparatus as in claim 36, wherein the write start position correction unit generates a signal for determining a timing to load the image data.

39. An image forming apparatus as in claim 36, wherein the write start position correction unit shifts the start position of the image recording based on a difference of light amount between an actual light and a predetermined reference light.

40. An image forming apparatus as in claim 36, wherein the write start position correction unit shifts the start position of the image recording based on a difference of light amount between an actual light and a reference light, which is determined when a write start position in the main scanning direction on the photosensitive member is adjusted through image forming onto the photosensitive member.

41. An image forming apparatus as in claim 36, wherein the start position shift amount data stored in the memory is changed.

42. An image forming apparatus as in claim 36, wherein the memory prestores a plurality of different correction data tables each including light amount data of the light source determined under various image forming conditions and corresponding start position shift amount data.

43. An image forming apparatus as in claim 42, further comprising an operator input mechanism configured to allow an operator to input an instruction to select one of the plurality of different correction data tables.

44. An image forming apparatus as in claim 36, wherein the at least one image forming mechanism includes image forming mechanisms configured to individually produce yellow, magenta, cyan, and black color images.

45. An image forming apparatus as in claim 44, wherein the optical systems of the at least one image forming mechanism including the image forming mechanisms for yellow, magenta, cyan, and black colors share a common polygon mirror.

46. An image forming apparatus, comprising:
at least one image forming means for forming an image based on image data, said image forming means comprising:
optical scanning means for scanning a surface of a photosensitive member with a light beam emitted from a light source based on said image data,
sensing means for detecting the light beam at an initial side before an image region on a scanning line in a main scanning direction on the photosensitive member and to output a sync detect signal,
data storing means for storing a correction data table including predetermined light amount data of the light source determined under various image forming conditions and corresponding start position shift amount data including a plurality of time shift amounts corresponding to the predetermined light amount data, and
control means for controlling a light amount of the light source according to the image forming conditions and for determining a start position of the image recording based on the sync detect signal detected by the sensing means, wherein
the control means including a write start position correcting means for shifting the start position of the image recording based on a start position shift amount data from the correction data table when the light amount of the light source is changed under various image forming conditions.

47. An image forming apparatus as in claim 46, wherein the write start position correcting means shifts the start position of the image recording in two stages according to a unit of a pixel dot and a unit smaller than a pixel dot.

48. An image forming apparatus as in claim 46, wherein the write start position correcting means generates a signal for determining a timing to load the image data.

49. An image forming apparatus as in claim 46, wherein the write start position correcting means shifts the start position of the image recording based on a difference of light amount between an actual light and a predetermined reference light.

50. An image forming apparatus as in claim 46, wherein the write start position correcting means shifts the start position of the image recording based on a difference of light amount between an actual light and a reference light, which is determined when a write start position in the main scanning direction is adjusted through image forming onto the photosensitive member.

51. An image forming apparatus as in claim 46, wherein the start position shift amount data stored in the data storing means is changed.

52. An image forming apparatus as in claim 46, wherein the data storing means prestores a plurality of different correction data tables each including light amount data of the light source predetermined under various image forming conditions and corresponding start position shift amount data.

53. An image forming apparatus as in claim 52, further comprising operator input means for allowing an operator to input an instruction for selecting one of the plurality of different correction data tables.

54. An image forming apparatus as in claim 46, wherein the at least one image forming means includes image forming means for individually producing yellow, magenta, cyan, and black color images.

55. An image forming apparatus as in claim 54, wherein the optical scanning means of the at least one image forming means including the image forming means for handling yellow, magenta, cyan, and black color images share a common polygon mirror.

56. A method of image forming, comprising:
separating image data into a plurality of image data streams;
providing a plurality of image forming mechanisms corresponding to the plurality of image data streams;
handling in parallel the plurality of image data streams by the plurality of image forming mechanisms;
scanning by each of the plurality of image forming mechanisms a surface of a photosensitive member with a light beam emitted from a light source in accordance with each of the plurality of image data streams;
detecting by each of the plurality of image forming mechanisms the light beam at an initial side before an image region on a scanning line in a main scanning direction of the photosensitive member and producing a sync detect signal;
storing in each of the plurality of image forming mechanisms a correction data table including predetermined light amount data of the light source determined based on image forming conditions and corresponding start position shift amount data including a plurality of time shift amounts corresponding to the predetermined light amount data;
controlling in each of the plurality of image forming mechanisms a light amount of the light source under various image forming conditions;
determining in each of the plurality of image forming mechanisms a start position of an image recording in accordance with the sync detect signal detected by the detecting step; and
shifting in each of the plurality of image forming mechanisms the start position of the image recording based on a start position shift amount data from the correction data table when the light amount of the light source is changed under various image forming conditions.

57. A method as in claim 56, wherein the shifting shifts the start position of the image recording in two stages corresponding to a unit of a pixel dot and a unit smaller than a pixel dot.

58. A method as in claim 56, wherein the shifting generates a signal for determining a timing to load the image data.

59. A method as in claim 56, wherein the shifting shifts the start position of the image recording based on a difference of the light amount between an actual light and a predetermined reference light.

60. A method as in claim 56, wherein the shifting shifts the start position of the image recording based on a difference of the light amount between an actual light and a reference light, which is determined when a write start position in the main scanning direction is adjusted through an image forming onto the photosensitive member.

61. A method as in claim 56, wherein the corresponding start position shift amount data stored in the storing is changed.

62. A method as in claim 56, wherein the storing prestores a plurality of different correction data tables each containing light amount data of the light source determined under various image forming conditions and corresponding start position shift amount data.

63. A method as in claim 62, further comprising allowing an operator to input an instruction for selecting one of the plurality of different correction data tables.

64. A method as in claim 56, wherein the plurality of image forming mechanisms includes image forming mechanisms for individually producing yellow, magenta, cyan, and black color images.

65. A method as in claim 56, wherein the plurality of image forming mechanisms including the image forming mechanisms for yellow, magenta, cyan, and black color images share a common polygon mirror.

* * * * *